(12) United States Patent
Tsushima et al.

(10) Patent No.: US 7,707,418 B2
(45) Date of Patent: Apr. 27, 2010

(54) COMMUNICATION SYSTEM, COMMUNICATION METHOD, BASE STATION APPARATUS, CONTROLLER, DEVICE, AND RECORDING MEDIUM STORING CONTROL PROGRAM

(75) Inventors: Tsunehito Tsushima, Neyagawa (JP); Yasuyuki Shintani, Nishinomiya (JP); Michihiro Matsumoto, Joyo (JP)

(73) Assignee: Panasonic Corporation, Osaka (JP)

( * ) Notice: Subject to any disclaimer, the term of this patent is extended or adjusted under 35 U.S.C. 154(b) by 1189 days.

(21) Appl. No.: 10/876,577

(22) Filed: Jun. 28, 2004

(65) Prior Publication Data

US 2005/0021959 A1    Jan. 27, 2005

(30) Foreign Application Priority Data

Jun. 30, 2003    (JP)    ............................. 2003-186809

(51) Int. Cl.
*H04L 9/32*    (2006.01)
*H04M 1/66*    (2006.01)

(52) U.S. Cl. ...................................... 713/170; 455/411
(58) Field of Classification Search ................. 713/170; 380/247; 455/411
See application file for complete search history.

(56) References Cited

U.S. PATENT DOCUMENTS 6,047,176 A * 4/2000 Sakamoto et al. ......... 455/422.1
7,209,466 B2 * 4/2007 Cabana ....................... 370/338
7,224,802 B2 * 5/2007 Hosaka ....................... 380/274
2001/0036273 A1  11/2001 Yoshizawa
2002/0154776 A1 * 10/2002 Sowa et al. .................. 380/247
2003/0153300 A1  8/2003 Nakao

FOREIGN PATENT DOCUMENTS

| JP | 2872996 | 1/1999 |
|---|---|---|
| JP | 2002-291033 | 10/2002 |
| JP | 2003-070062 | 3/2003 |
| JP | 2003-179699 | 6/2003 |
| JP | 2003-235076 | 8/2003 |

OTHER PUBLICATIONS

Office Action issued May 12, 2009 in corresponding Japanese patent Applicatin No. 2004-152202 with English translation.

* cited by examiner

*Primary Examiner*—Kimyen Vu
*Assistant Examiner*—Suman Debnath
(74) *Attorney, Agent, or Firm*—Wenderoth, Lind & Ponack, L.L.P.

(57) ABSTRACT

A communication system is constructed in such a manner that a user is allowed to designate a controller 1 and a wireless device 3 simultaneously to start authentication for connection with a wireless base station 2 to specify the device to be connected, and to establish connection authentication without a password for the first time. Thereafter, the controller 1 distributes a password to the wireless base station 2 and to the wireless device 3 to cancel the connection authentication. Next, connection authentication with the distributed password is established. Thus, the communication system makes it possible to substantially automatically establish connection authentication, thereby eliminating a cumbersome operation by the user in implementing the connection authentication process.

15 Claims, 17 Drawing Sheets

← : FLOW OF CONTROL

FIG.6

| UNIQUE ADDRESS(HEX) | LINK KEY |
|---|---|
| A36B35 | ****** |
| 4B3346 | ****** |
| ... | ... |

← : FLOW OF CONTROL

FIG.17A

| UNIQUE ADDRESS(HEX) | LINK KEY |
|---|---|
| A36B35 | (NOT PROVIDED) |
| (NOT PROVIDED) | (NOT PROVIDED) |

FIG.17B

| UNIQUE ADDRESS(HEX) | LINK KEY |
|---|---|
| A36B35 | 23bC |
| (NOT PROVIDED) | (NOT PROVIDED) |

COMMUNICATION SYSTEM, COMMUNICATION METHOD, BASE STATION APPARATUS, CONTROLLER, DEVICE, AND RECORDING MEDIUM STORING CONTROL PROGRAM

BACKGROUND OF THE INVENTION

1. Field of the Invention

The present invention relates to a communication system, a communication method, a base station apparatus, a controller, a device, and a recording medium storing control program for controlling the base station apparatus, the controller, and the device, and more particularly to a communication system, a communication method, a base station apparatus, a controller, a device, and a recording medium storing control program, using password setting on the device for connection authentication, and a password.

2. Description of the Related Art

Radio communication systems such as Bluetooth, IEEE802.11b, and infrared data communication allow for simultaneous connection of multiple devices, utilizing characteristics of a radio wave. However, sufficient attention must be paid to ensure system security and confidentiality in such radio communication. Conventional security systems for radio communication systems include the radio terminal security system as disclosed in Japanese Patent No. 2872996, and the one-time password system as used in the Internet. These security systems include electronic keys and radio terminals, and prohibit successive use of the same key to increase security, thereby providing increased safety against loss and theft of the key.

The user authentication system used in the Bluetooth is described in the following. The user authentication system used in the Bluetooth is administered by two elements: a unique password set up on each device (called a PIN (Personal Identification Number) code); and an encryption key (called a link key) created by the password and an ID code unique to the device (information such as a 48-bit address, assigned by IEEE).

Consider now the case where a device A makes access to a device B. In the situation in which the device A and the device B are connected with each other for the first time, the device A is required to input the PIN code of the device B. Upon receiving the PIN code from the device A, the device B checks it for validity. If the PIN code is authenticated, then, the device B creates a link key for the device A. The resulting link key is stored together with the unique address of the device A.

If, on the other hand, the device A was connected to the device B in the past, since the link key had already been registered in the device B, authentication is made through the link key. In this way, the Bluetooth provides authentication using the PIN code unique to each device, and the link key table created based on the PIN codes. The PIN code, while being unique, can be altered by the device user into any other string of characters.

The security system disclosed in Japanese Patent No. 2872996, the one-time password system in the Internet, and the user authentication system in the Bluetooth can be said to be password management and authentication systems intended to provide only increased security. The use of the user authentication system in ad hoc network environment causes problems as described below.

As an application of the user authentication system used in the Bluetooth, consider a home network system in which a home-use device is connected to a network. Each individual device is required to establish a fiduciary relationship based on the above user authentication system. Namely, a fiduciary relationship is established by notifying the private PIN code of each individual user to ensure security. However, inexpensive devices such as battery-driven sensor devices do not have interfaces for allowing users to enter the PIN codes. Setting of PIN codes identical to each other is required in establishing connection authentication of devices, which is a cumbersome operation for users in preparing connection of the devices.

BRIEF SUMMARY OF THE INVENTION

In view of the above, it is an object of the present invention to provide a communication system, a communication method, a base station apparatus, a controller, a device, and a recoding medium storing control program to semi-automatically establish connection authentication of a specific device, without need of a cumbersome operation by a user of entering a password, a PIN code, or the like.

According to an aspect of the present invention, a communication system provided with a base station apparatus, a controller connected with the base station apparatus, and a device, which is operative to require authentication for connection with the base station apparatus, is constructed such that: the controller includes device registration starting means which starts registration of the device, and authentication information distributing means which distributes, to the base station apparatus, authentication information determined by the controller; the base station apparatus includes (i) base station authentication information storing means, which stores the authentication information distributed by the authentication information distributing means, (ii) base station authentication information distributing means which distributes, to the device, the authentication information stored in the base station authentication information storing means, and (iii) connection authenticating means which authenticates connection with the device; and the device includes (i) device authentication starting means, which starts requesting authentication for connection with the base station apparatus, (ii) device authentication information storing means, which stores the authentication information distributed by the base station authentication information distributing means, and (iii) connection authentication requesting means which requests the connection authentication from the base station apparatus. The connection authenticating means requests the authentication information from the device in response to accepting the connection authentication request by the connection authentication requesting means. The connection authentication requesting means reads out the authentication information stored in the device authentication information storing means, and sends the readout authentication information to the base station apparatus in response to accepting the authentication information request by the connection authenticating means. The connection authenticating means receives the authentication information sent from the connection authentication requesting means, and authenticates connection with the device if it is judged that the received authentication information coincides with the authentication information stored in the base station authentication information storing means.

These and other objects, features and advantages of the present invention will become more apparent upon reading of the following detailed description along with the accompanying drawings.

BRIEF DESCRIPTION OF THE DRAWINGS

FIG. 6 is an illustration showing an example of a table used for user authentication in Bluetooth wireless technology.

FIGS. 17A and 17B are illustrations showing examples of an address table provided in an access point.

DETAILED DESCRIPTION OF THE INVENTION

In the following, preferred embodiments of the present invention are described referring to the accompanying drawings.

First Embodiment

In this embodiment, a case is described where a wireless base station 2 authenticates connection with a wireless device 3 for the first time.

Figure 1:
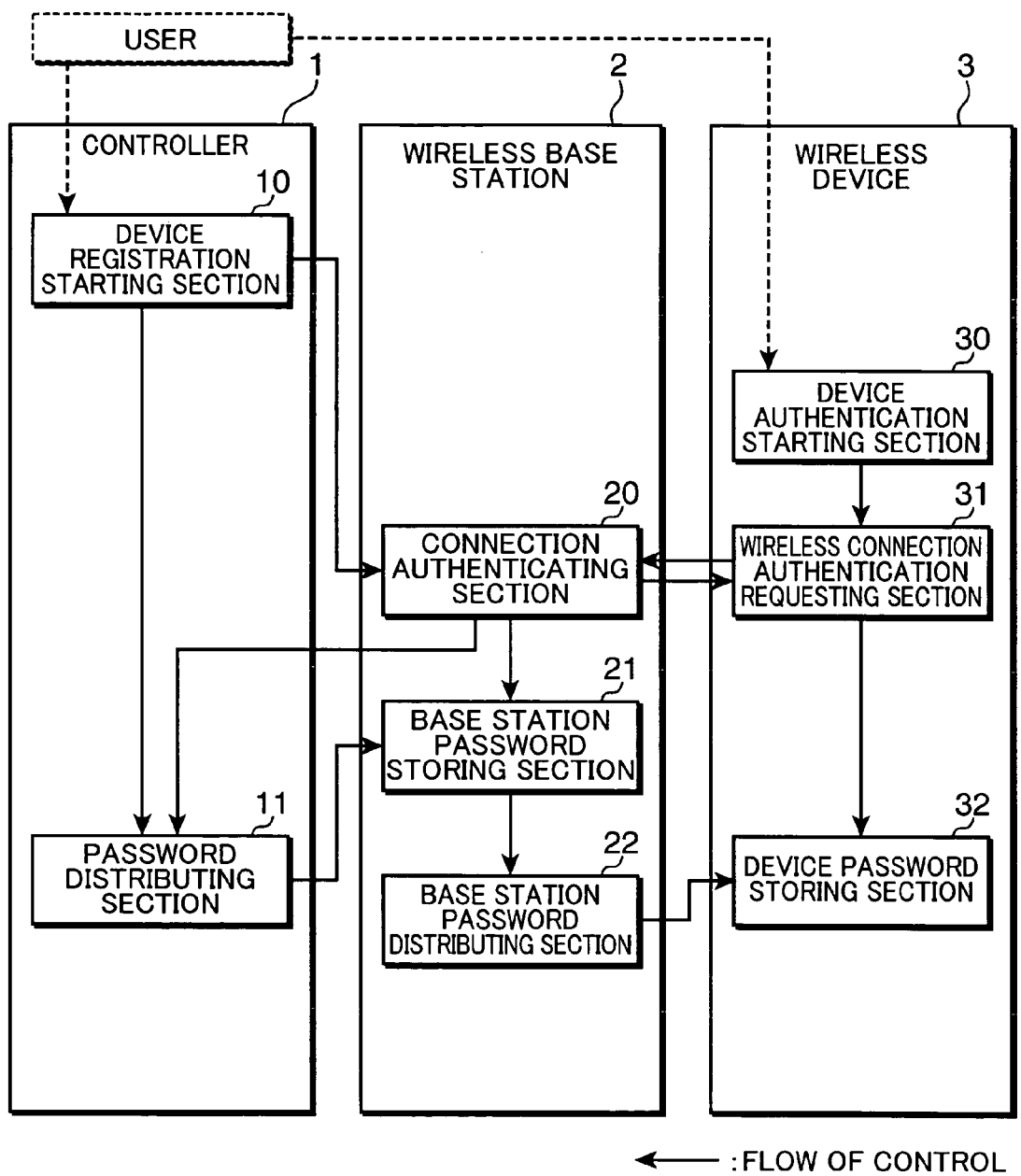
FIG. 1 is an illustration showing a configuration of a wireless communication system in accordance with a first embodiment of the present invention.

FIG. 1 is an illustration showing a configuration of a wireless communication system in accordance with a first embodiment of the present invention. Referring to FIG. 1, the inventive wireless communication system includes a controller 1, the wireless base station (or access point) 2, and the wireless device 3. The controller 1 is wire-connected with the wireless base station 2, and the wireless device 3 is communicatively connected with the wireless communication system when the connection is authenticated by the wireless base station 2. A user manipulates the controller 1 to control the wireless device 3 via the wireless base station 2. In this embodiment, the wireless base station 2 is an example of the base station apparatus, and the wireless device 3 is an example of the device.

The controller 1 includes a device registration starting section 10 which starts acceptance of authentication for connection with the wireless device 3, and a password distributing section 11 which stores a password (authentication information determined by the controller 1) in advance, and distributes the password to the wireless base station 2 and to the wireless device 3.

The wireless base station 2 includes (i) a connection authenticating section 20 which authenticates a connection with the wireless device 3 based on a request of connection authentication from the wireless device 3, (ii) a base station password storing section 21, which receives and stores the password distributed from the password distributing section 11, and (iii) a base station password distributing section 22 which distributes, to the wireless device 3, the password stored in the base station password storing section 21.

The wireless device 3 includes a device authentication starting section 30, a wireless connection authentication requesting section 31, and a device password storing section 32. The device authentication starting section 30 starts an authentication process for connection with the wireless base station 2. The wireless connection authentication requesting section 31 requests the wireless base station 2 to perform the connection authentication process, based on a command from the device authentication starting section 30, and implements the authentication process. The device password storing section 32 receives and stores the password distributed from the password distributing section 11.

In this embodiment, the device registration starting section 10 is an example of device registration starting means, the password distributing section 11 is an example of authentication information distributing means, the base station password storing section 21 is an example of base station authentication information storing means, the base station password distributing section 22 is an example of base station authentication information distributing means, the connection authenticating section 20 is an example of connection authenticating means, the device authentication starting section 30 is an example of the device authentication starting means, the device password storing section 32 is an example of device authentication information storing means, and the wireless connection authentication requesting section 31 is an example of connection authentication requesting means.

Figure 2:
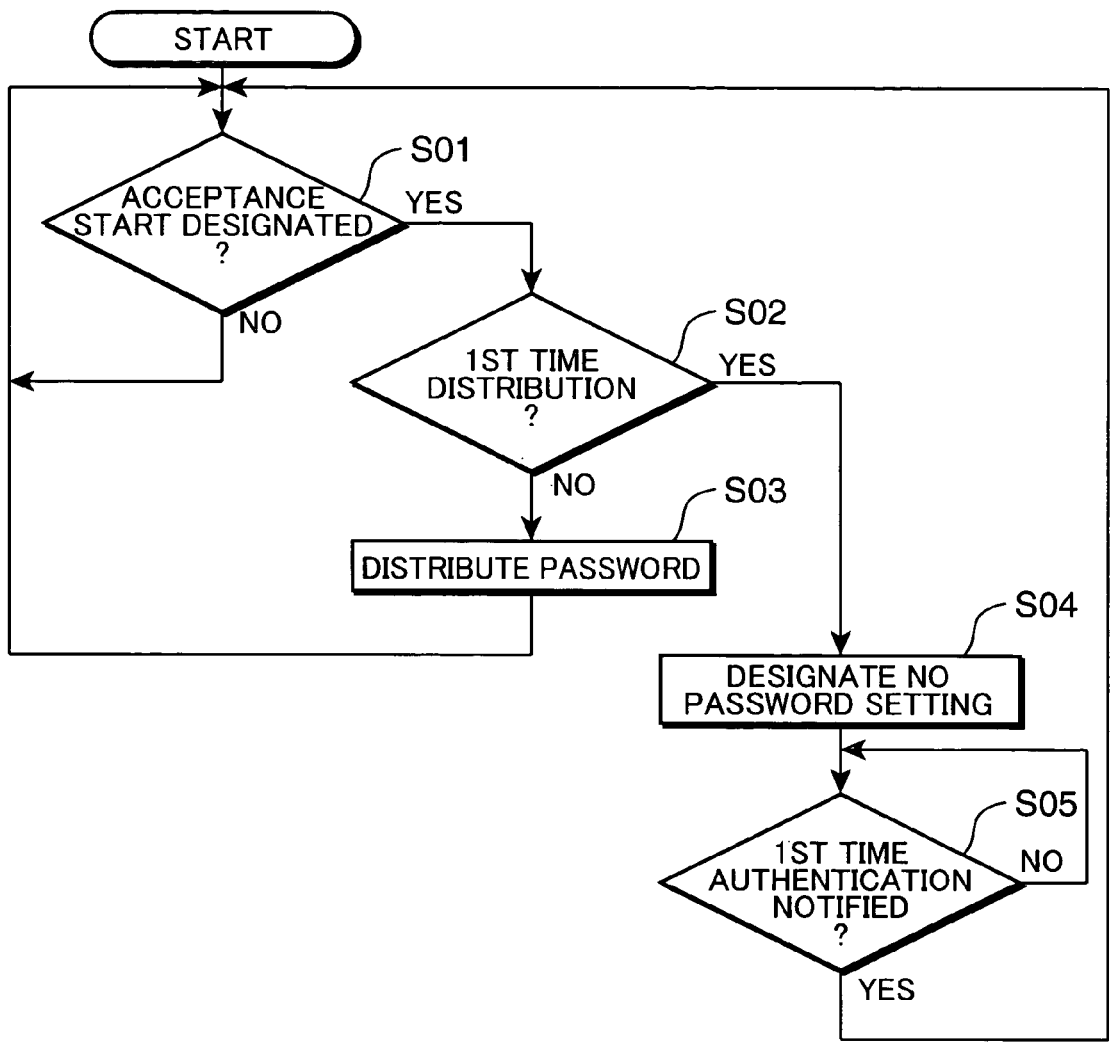
FIG. 2 is a flowchart showing a process of a controller in the wireless communication system in accordance with the first embodiment of the present invention.
Figure 3:
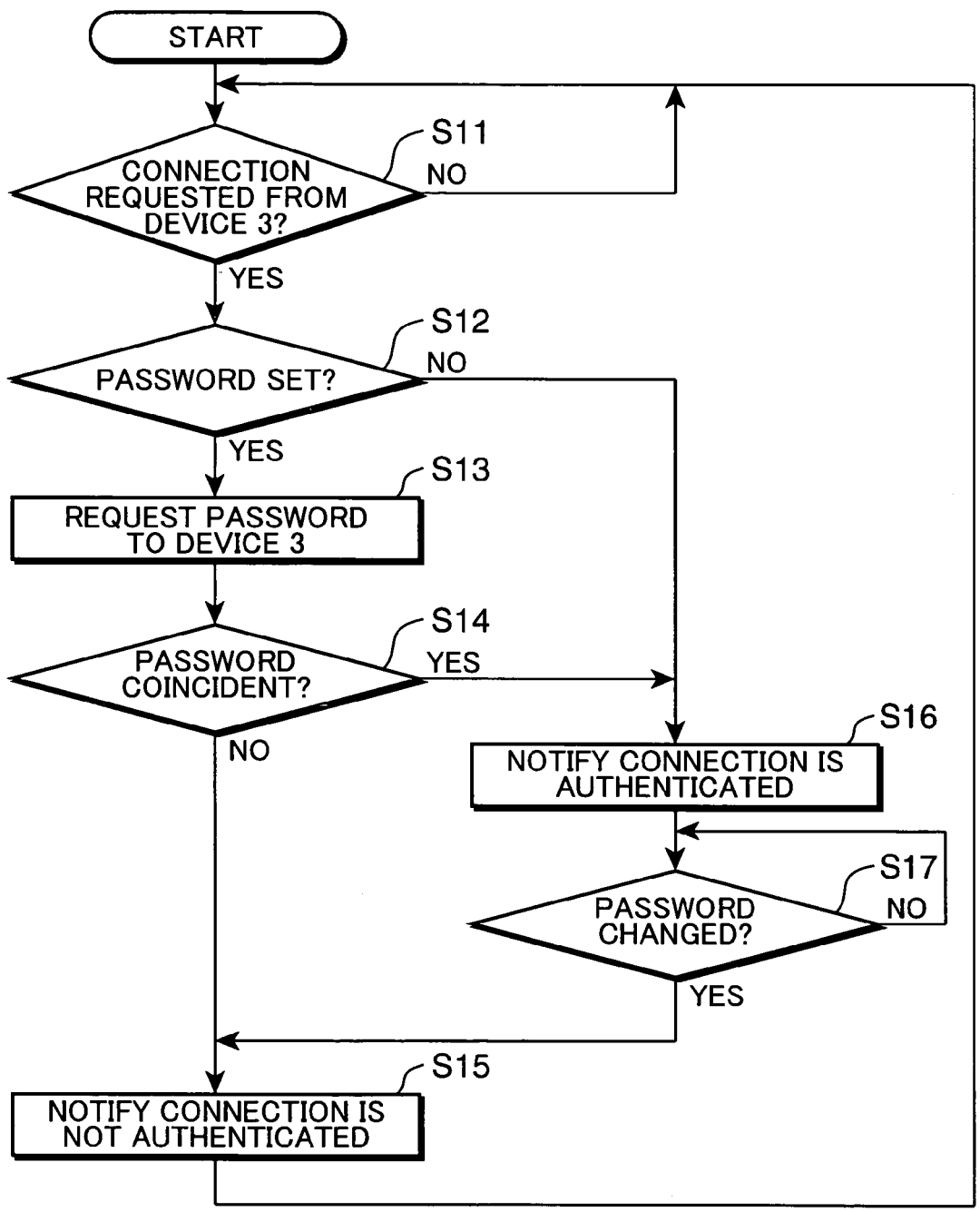
FIG. 3 is a flowchart showing a process of a wireless base station in the wireless communication system in accordance with the first embodiment of the present invention.
Figure 4:
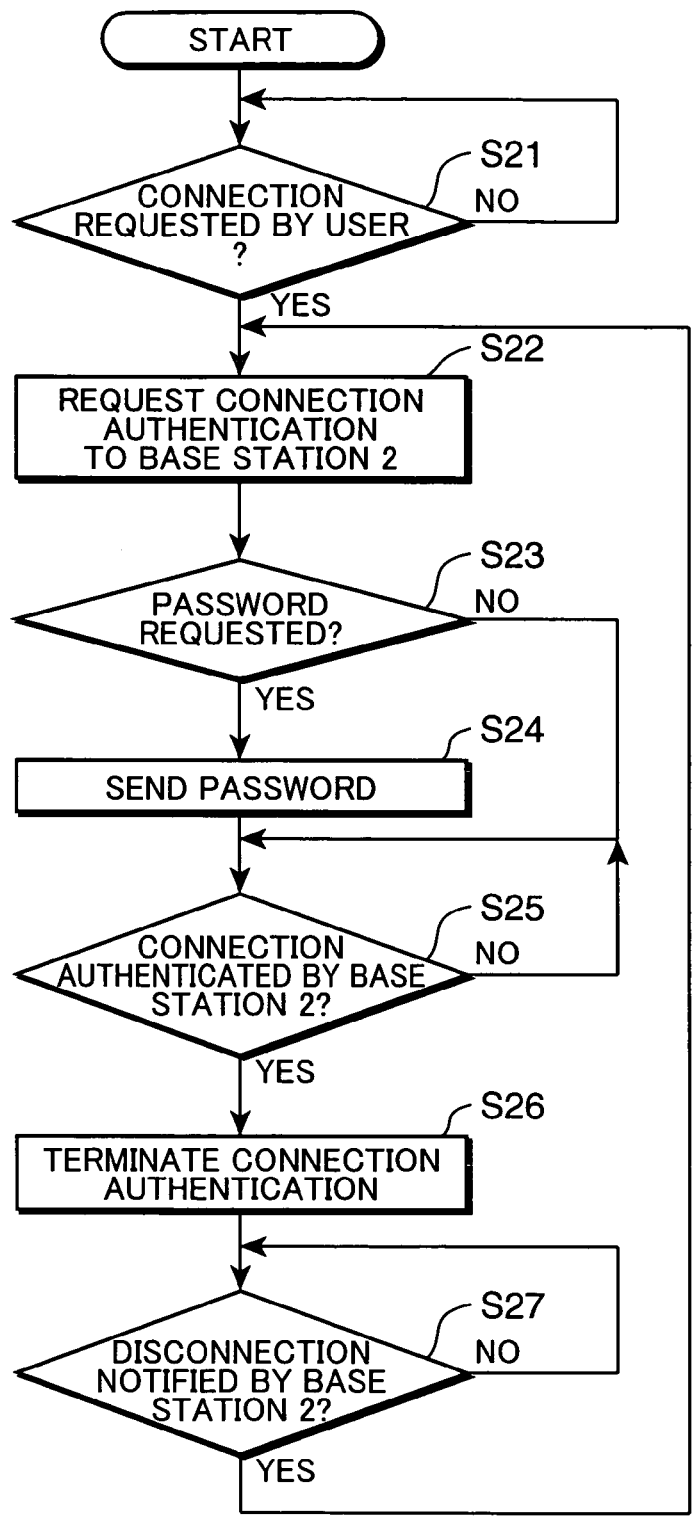
FIG. 4 is a flowchart showing a process of a wireless device in the wireless communication system in accordance with the first embodiment of the present invention.

FIG. 2 is a flowchart showing a process of the controller 1. FIG. 3 is a flowchart showing a process of the wireless base station 2. FIG. 4 is a flowchart showing a process of the wireless device 3.

Referring to FIG. 2, the device registration starting section 10 starts acceptance of registration of the wireless device 3 in response to manipulation by a user (Step S01), and notifies the password distributing section 11 of the acceptance of registration of the wireless device 3. The password distributing section 11 judges whether a password is distributed for the first time (Step S02). If it is judged that the distribution is for the first time (YES in Step S02), the password distributing section 11 designates no password setting to the base station password storing section 21 (Step S04). Since the password is distributed for the first time, the password distributing section 11 informs the base station password storing section 21 that the password stored in the password distributing section 11 is not distributed, namely, the password is not set in the base station password storing section 21. Thus, the base station password storing section 21 stores no password.

Referring to FIG. 4, if the device authentication starting section 30 receives a request to start an authentication process in response to manipulation by the user (YES in Step S21), the device authentication starting section 30 starts implementing the authentication process, and notifies the wireless connection authentication requesting section 31 of the start of the authentication process. Then, the wireless connection authentication requesting section 31 sends, to the wireless base station 2, connection authentication request data within a reachable range of radio wave (Step S22). The wireless device 3 is required to acquire authentication for connection from the wireless base station 2 in order to communicate with the controller 1 via the wireless base station 2. Data to be sent from the wireless device 3 to the wireless base station 2 for acquiring the authentication is called as "connection authentication request data" herein.

Referring to FIG. 3, after the connection authenticating section 20 receives the connection authentication request data from the wireless connection authentication requesting section 31 (YES in Step S11), the connection authenticating section 20 judges whether a password is stored in the base station password storing section 21 by reading out the password therefrom (Step S12). If it is judged that no password is stored in the base station password storing section 21 (NO in Step S12), then, the wireless base station allows connection with the wireless device 3 without a password. This is the first time authentication to the wireless device 3. Namely, the wireless device 3 is allowed to be communicated with the controller 1 without a password, i.e., without implementing an authentication process. Subsequently, the connection authenticating section 20 notifies the password distributing section 11 and the wireless connection authentication requesting section 31 that the connection of the wireless device 3 has been authenticated (Steps S16, YES in S05).

Referring back to FIG. 2, the password distributing section 11 stores a password in advance. A predetermined password is allocated to each password distributing section 11 before shipment of the controller 1. Alternatively, the passwords may be variable, and optionally set by users. Further alternatively, the passwords may be automatically allocated with respect to each device at random.

In FIG. 2, if it is judged that the password distribution is not for the first time (NO in Step S02), the password distributing section 11 sends the stored password to the base station password storing section 21 of the wireless base station 2 (Step S03). The base station password storing section 21 stores the password sent from the password distributing section 11. Then, the base station password distributing section 22 of the base station 2 sends, to the device password storing section 32 of the wireless device 3, the password that has been sent from the password distributing section 11 and stored in the base station password storing section 21. Thus, the device password storing section 32 stores the password sent from the base station password distributing section 22.

Referring back to FIG. 3, if the connection authenticating section 20 is notified that the password has been changed (YES in Step S17), then, the connection authenticating section 20 notifies the wireless connection authentication requesting section 31 of cancellation of the connection authentication, and disconnection of the communication (Step S15).

Referring back to FIG. 4, if the wireless connection authentication requesting section 31 is notified of the cancellation of the connection authentication from the wireless base station 2 (YES in Step S27), the wireless connection authentication requesting section 31 sends again the connection authentication request data within the radio wave reachable range (Step S22).

Referring back to FIG. 3, upon receiving the connection authentication request data from the wireless connection authentication requesting section 31 (YES in Step S11), the connection authenticating section 20 reads out the password from the base station password storing section 21. Since the password is set (stored) in the base station password storing section 21 (YES in Step S12), the connection authenticating section 20 requests the wireless connection authentication requesting section 31 to send the password (Step S13).

Referring back to FIG. 4, upon accepting the password request from the connection authenticating section 20 (YES in Step S23), the wireless connection authentication requesting section 31 reads out the password from the device password storing section 32, and sends the password to the connection authenticating section 20 (Step S24).

Referring back to FIG. 3, the connection authenticating section 20 compares the received password with the password stored in the base station password storing section 21 (Step S14). If the received password and the password stored in the base station password storing section 21 are coincident with each other (YES in Step S14), the connection authenticating section 20 authenticates connection of the wireless device 3 with the controller 1. This is the second time authentication to the wireless device 3. The connection authenticating section 20 notifies the wireless connection authentication requesting section 31 that the connection has been authenticated (Step S16). If the received password and the password stored in the base station password storing section 21 are not coincident with each other (NO in Step S14), the connection authenticating section 20 notifies the wireless connection authentication requesting section 31 that the connection has not been authenticated (Step S15).

Referring back to FIG. 4, when the wireless device 3 receives the connection authentication from the wireless base station 2 (YES in Step S25), the connection authentication process is terminated (Step S26).

In this way, when registration of the wireless device 3 is initiated by the device registration starting section 10 of the controller 1, the password distributing section 11 distributes, to the wireless base station 2, the password allocated to the wireless device 3. The password distributed by the password distributing section 11 is stored in the base station password storing section 21. The password stored in the base station password storing section 21 is also distributed to the wireless device 3 by the base station password distributing section 22. The password distributed by the base station password distributing section 22 is stored in the device password storing section 32 of the wireless device 3. When the connection authentication request for the wireless device 3 is initiated by the device authentication starting section 30 of the wireless device 3, the wireless connection authentication requesting section 31 requests the wireless base station 2 for connection authentication. When the connection authenticating section 20 accepts the connection authentication request from the wireless connection authentication requesting section 31, the connection authenticating section 20 requests the password from the wireless device 3. When the wireless connection authentication requesting section 31 accepts the password request from the connection authenticating section 20, the password is read out from the device password storing section 32, and the readout password is sent to the wireless base station 2. Thus, the connection authenticating section 20 receives the password sent from the wireless connection authentication requesting section 31, and allows connection of the wireless device 3 with the controller 1, if the received password and the password stored in the base station password storing section 21 are coincident with each other.

In other words, in response to a connection request from the wireless device 3, the controller 1 distributes, to the wireless base station 2, the password allocated to the wireless device 3 for storage therein. The password is also distributed to the wireless device 3 for storage therein. The connection authentication between the wireless device 3 and the wireless base station 2 is established using the password. This arrangement enables semi-automatic authentication of the connection of the specific wireless device 3 without a need of a cumbersome operation such as entering of a password or a PIN code by the user.

Further, if the connection authentication request by the connection authentication requesting section 31 is accepted prior to authentication, the connection with the wireless device 3 is allowed without a password, whereas, if the base station password distributing section 22 distributes a password to the wireless device 3, the connection with the wireless device 3 is disconnected. If the connection authenticating section 20 accepts connection authentication request from the connection authentication requesting section 31 again, the connection authenticating section 20 requests the wireless connection authentication requesting section 31 for the password allocated to the wireless device 3. When the password request of the connection authenticating section 20 is accepted by the wireless connection authentication requesting section 31, the password is read out from the device password storing section 32, and the readout password is sent to the wireless base station 2. The connection authenticating section 20 receives the password sent from the wireless connection authentication requesting section 31, and authenticates the connection with the wireless device 3 if the received password and the password stored in the base station password storing section 21 are coincident with each other.

In the above arrangement, if a password is not set for the wireless device 3, the wireless base station 2 and the wireless device 3 are connected with each other without the password. On the other hand, if a password is set for the wireless device 3, the connection between the wireless base station 2 and the wireless device 3 is disconnected. Thus, even in the case where a password is not set for the wireless device 3, the wireless base station 2 and the wireless device 3 are connectable with each other.

In the foregoing embodiment, since the base station password storing section 21 does not store a password in the first time connection authentication request, connection with the wireless device 3 is allowed without a password in the first time authentication. On the other hand, connection with a password is authenticated in the second time authentication and thereafter because the base station password storing section 21 stores the password in the second time connection authentication request and thereafter. Alternatively, the controller 1 may be provided with an authentication mode switching section, and judgment as to whether connection with a password is authenticated may be made by switching over the authentication mode with respect to the wireless device 3 between authentication non-activated mode where authentication is not implemented in response to the first time connection authentication request, and authentication activated mode where authentication is implemented in response to the second time connection authentication request and thereafter.

Figure 5:
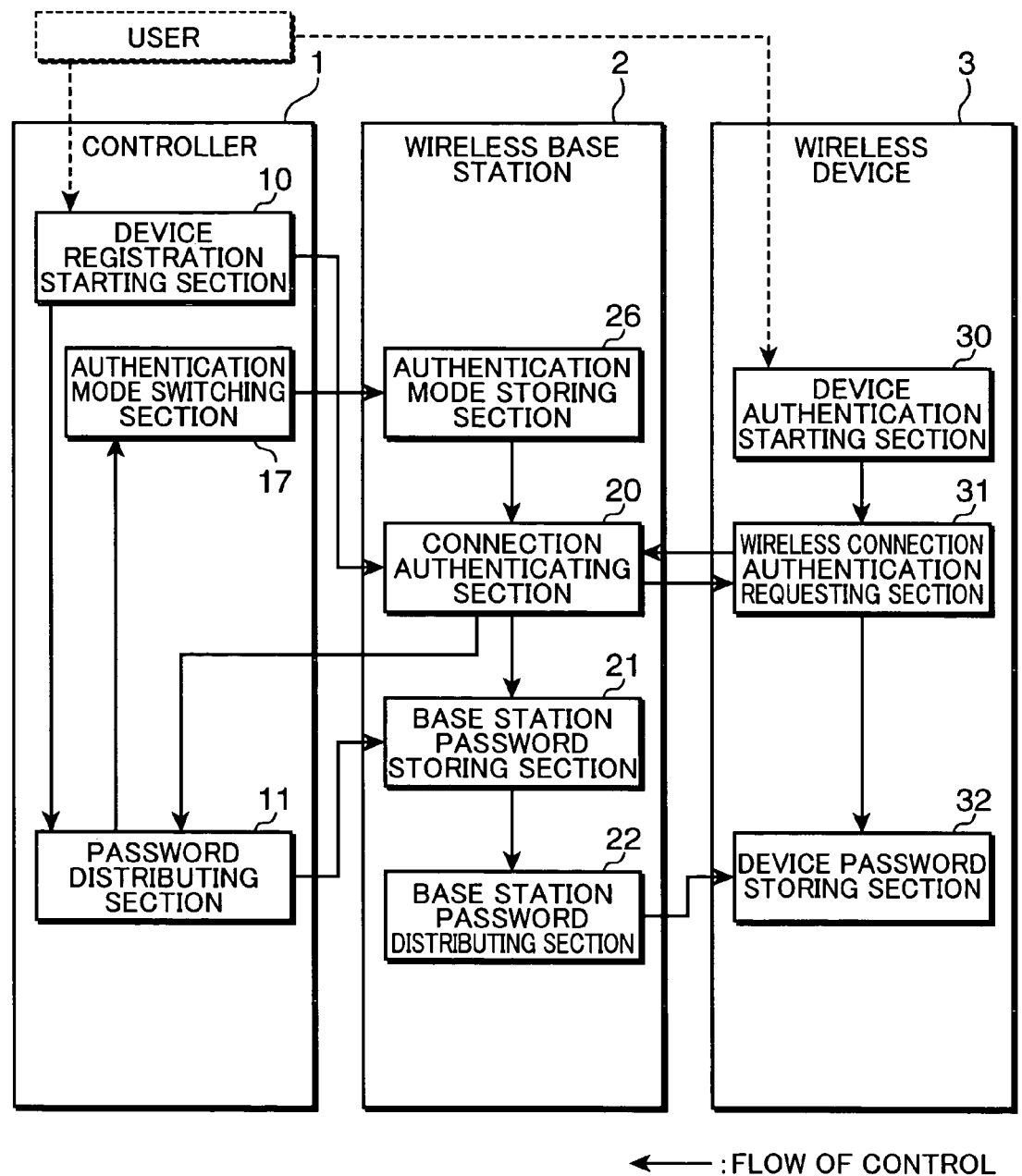
FIG. 5 is an illustration showing a modification of the wireless communication system in accordance with the first embodiment of the present invention.

FIG. 5 is an illustration showing a wireless communication system as a modification of the first embodiment of the present invention. The wireless communication system shown in FIG. 5 is constructed such that a controller 1 is provided with an authentication mode switching section 17, and a wireless base station 2 is provided with an authentication mode storing section 26, in addition to the arrangement of the wireless communication system shown in FIG. 1. Elements in FIG. 5 which are equivalent to those shown in FIG. 1 are denoted at the same reference numerals, and description thereof will be omitted herein.

The authentication mode switching section 17 shown in FIG. 5 switches over the authentication mode of the wireless base station 2 between the authentication activated mode and the authentication non-activated mode. The authentication mode storing section 26 stores the authentication mode designated by the authentication mode switching section 17. In the modification, the authentication mode switching section 17 is an example of authentication mode switching means, and the authentication mode storing section 26 is an example of authentication mode storing means.

In the following, an operation of the modification, which is different from the operation of the wireless communication system in accordance with the first embodiment, is described. A password distributing section 11 judges whether the password distribution is for the first time. If it is judged that the password is distributed for the first time, the authentication mode switching section 17 switches over the authentication mode of the wireless base station 2 to the authentication non-activated mode. Then, the authentication mode storing section 26 of the wireless base station 2 sets the authentication mode to the authentication non-activated mode, and stores the authentication mode therein. A connection authenticating section 20 receives connection authentication request data from a wireless connection authentication requesting section 31, reads out the authentication mode from the authentication mode storing section 26, recognizes that the readout authentication mode is the authentication non-activated mode, and allows connection of the wireless device 3 without a password.

On the other hand, if it is judged that the password distribution is not for the first time, the authentication mode switching section 17 switches over the authentication mode of the wireless base station 2 to the authentication activated mode. Then, the authentication mode storing section 26 of the wireless base station 2 sets the authentication mode to the authentication activated mode, and stores the authentication activated mode therein. The connection authenticating section 20 receives the connection authentication request data from the wireless connection authentication requesting section 31, reads out the authentication mode stored in the authentication mode storing section 26, recognizes that the readout authentication mode is the authentication activated mode, and allows connection of the wireless device 3 using the password.

In this way, the authentication mode switching section 17 switches over the authentication mode of the wireless base station 2 between the authentication activated mode and the authentication non-activated mode, and the authentication mode storing section 26 stores the authentication mode designated by the authentication mode switching section 17. When the connection authentication request from the wireless connection authentication requesting section 31 is accepted prior to authentication, the authentication mode of the wireless base station 2 is switched over to the authentication non-activated mode, whereas, when the connection authentication request from the wireless connection authentication requesting section 31 is accepted in response to the second time connection authentication request and thereafter, the authentication mode of the wireless base station 2 is switched over to the authentication activated mode. When the connection authenticating section 20 accepts the connection authentication request from the wireless connection authentication requesting section 31, judgment as to whether the password allocated to the wireless device 3 is requested is made based on the set authentication mode.

In this way, switching over the authentication mode makes it possible for the user to recognize a current status of the wireless device 3, namely, whether the wireless device 3 is in a state where a password is not set, and accordingly, authentication is made without the password, or a state where a password is set, and accordingly, authentication is made based on the password. Judgment as to whether the wireless base station 2 should request a password from the wireless device 3 can be made based on the currently-set authentication mode.

Further, it is preferable that a reply to data transmission may be received by communication between the respective sections in such a manner that, if there is no reply to data transmission, the same data may be transmitted an arbitrary number of times at a certain time interval to secure reliability of communication.

Furthermore, in the foregoing embodiment, the connection authenticating section 20 of the wireless base station 2 does not allow connection if it receives connection authentication request from multiple wireless devices. This arrangement eliminates likelihood that a password may be set for a wireless device other than the target wireless device 3 which the user wishes to register, and that the other wireless device may be erroneously registered.

Figure 6:
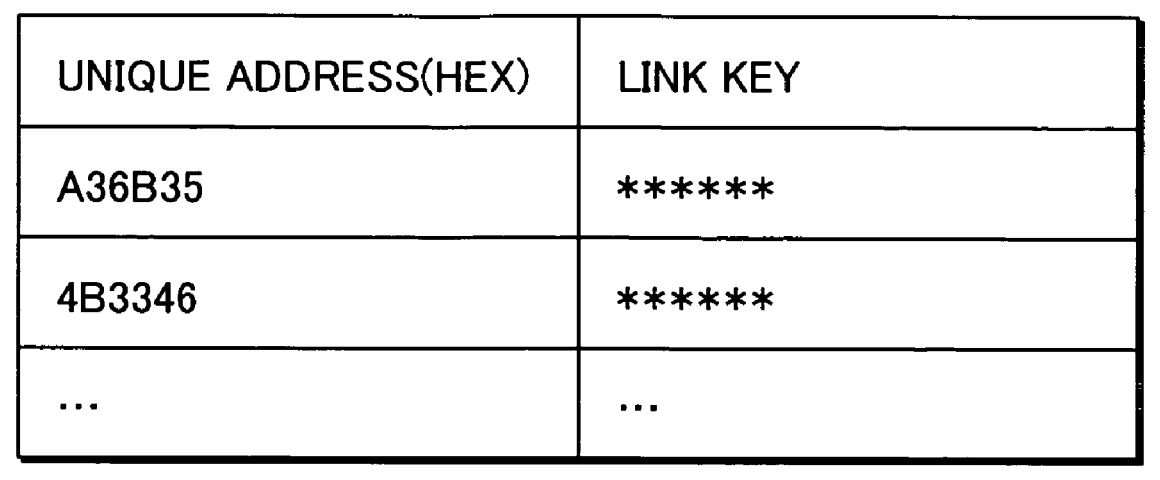

Once the connection authentication is established, a link to the wireless device 3 is provided, and a link key is created for the wireless device 3. The link key is stored along with an address unique to the wireless device 3 in the list of a table as exemplified in FIG. 6, in which the unique addresses of the respective devices which have been connected with the wireless base station 2, and the corresponding link keys are stored in association with each other. In the second time connection authentication request and thereafter, the wireless base station 2 performs the connection authentication process with respect to the wireless device 3 using the link key since the link key has already been registered in the table.

Second Embodiment

Figure 7:
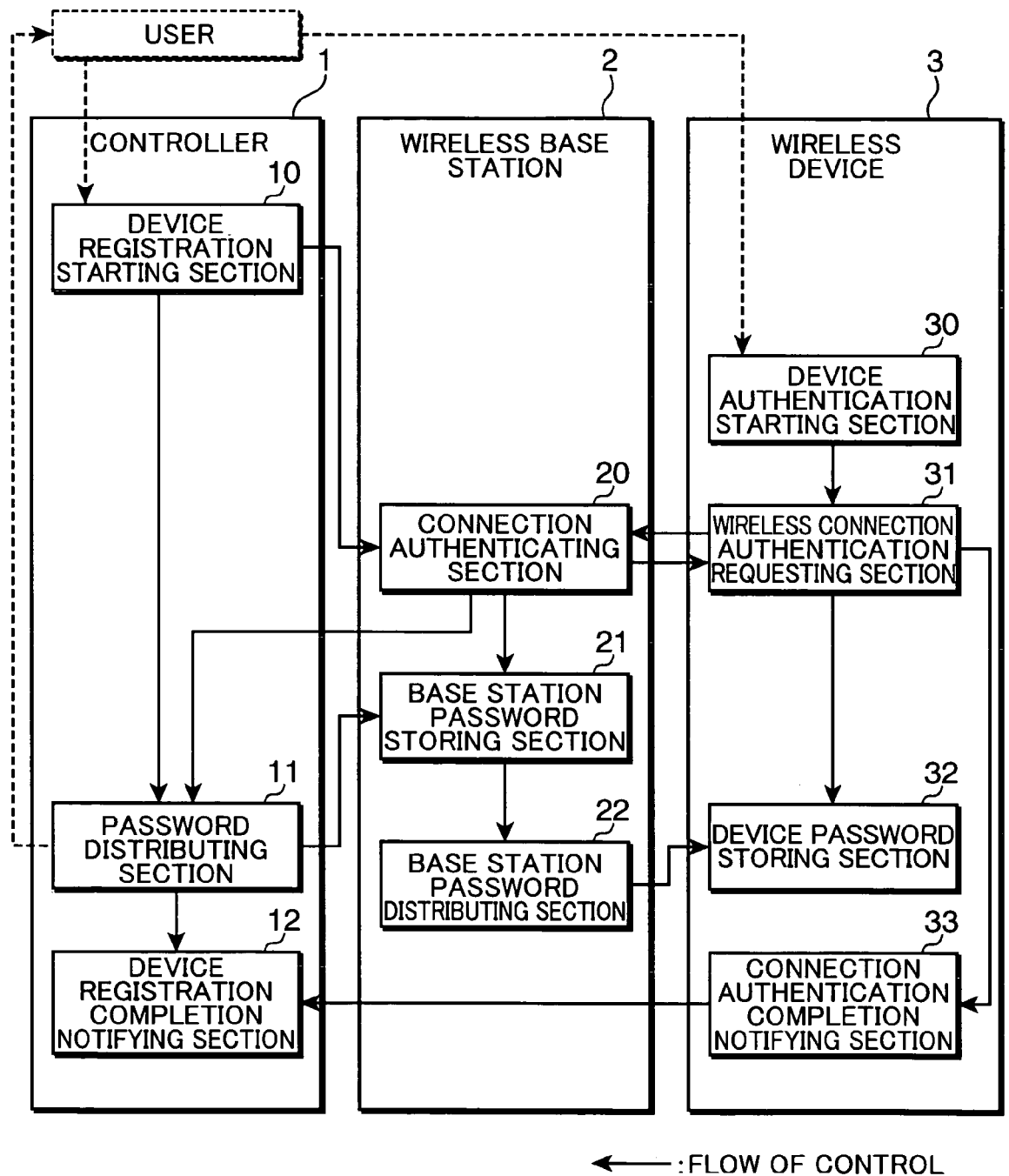
FIG. 7 is an illustration showing a configuration of a wireless communication system in accordance with a second embodiment of the present invention.

FIG. 7 is an illustration showing a second embodiment of the present invention. The second embodiment is different from the first embodiment in that a controller 1 is additionally provided with a device registration completion notifying section 12, and a wireless device 3 is additionally provided with a connection authentication completion notifying section 33. Elements in FIG. 7 which are equivalent to those shown in FIG. 1 are denoted at the same reference numerals, and description thereof will be omitted herein.

The wireless device 3 includes the connection authentication completion notifying section 33 which notifies the controller 1 of connection authentication completion, via a wireless base station 2, when the connection with a password (or in the authentication-activated mode) is authenticated by the wireless base station 2 in response to the second time connection authentication request.

The controller 1 includes the device registration completion notifying section 12 which receives the connection authentication completion notification from the connection authentication completion notifying section 33, and notifies the user that registration of the wireless device 3 has been completed.

In this embodiment, the connection authentication completion notifying section 33 is an example of connection authentication completion notifying means, and the device registration completion notifying section 12 is an example of device registration completion notifying means.

Figure 8:
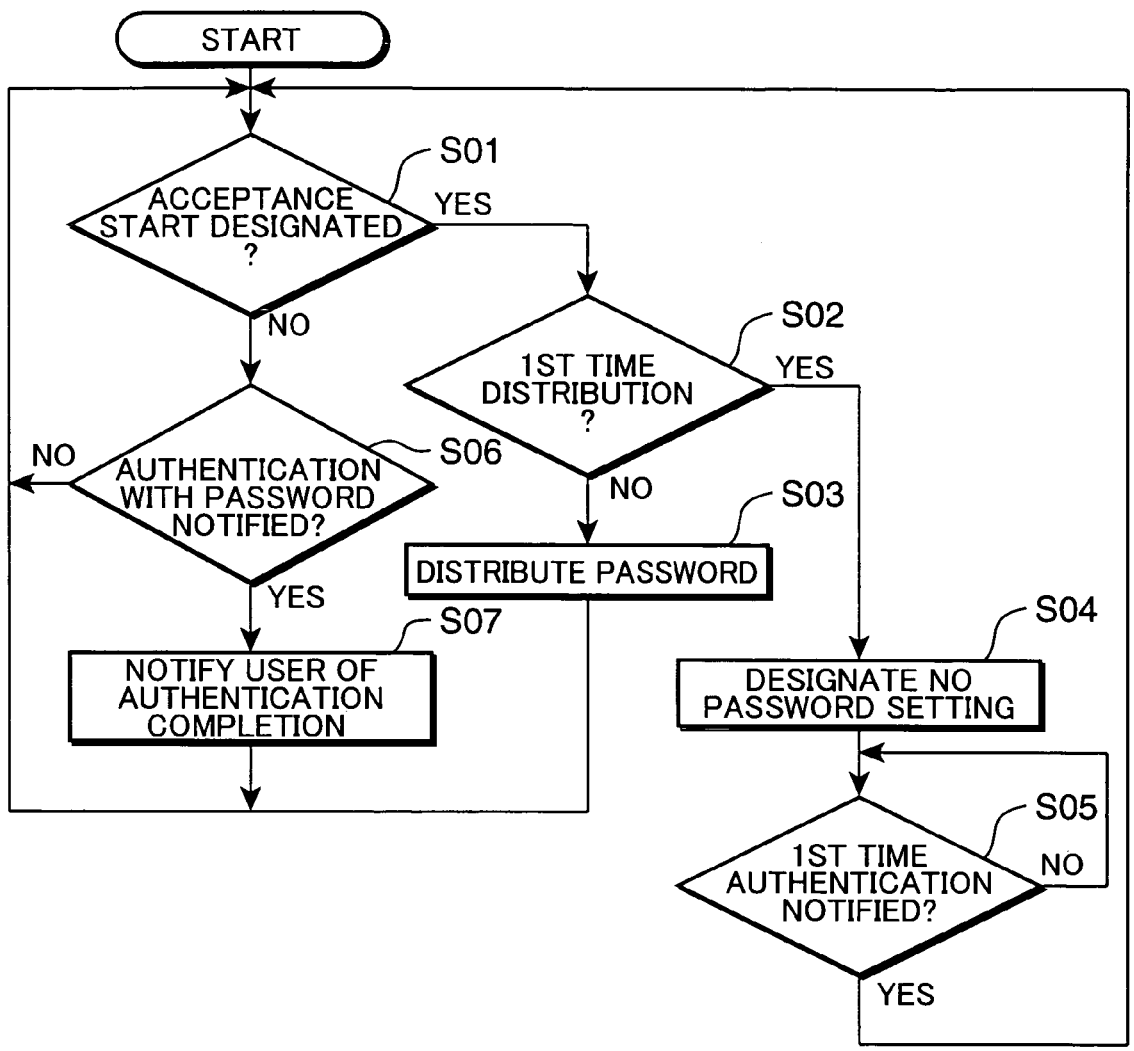
FIG. 8 is a flowchart showing a process of a controller in the wireless communication system in accordance with the second embodiment of the present invention.
Figure 9:
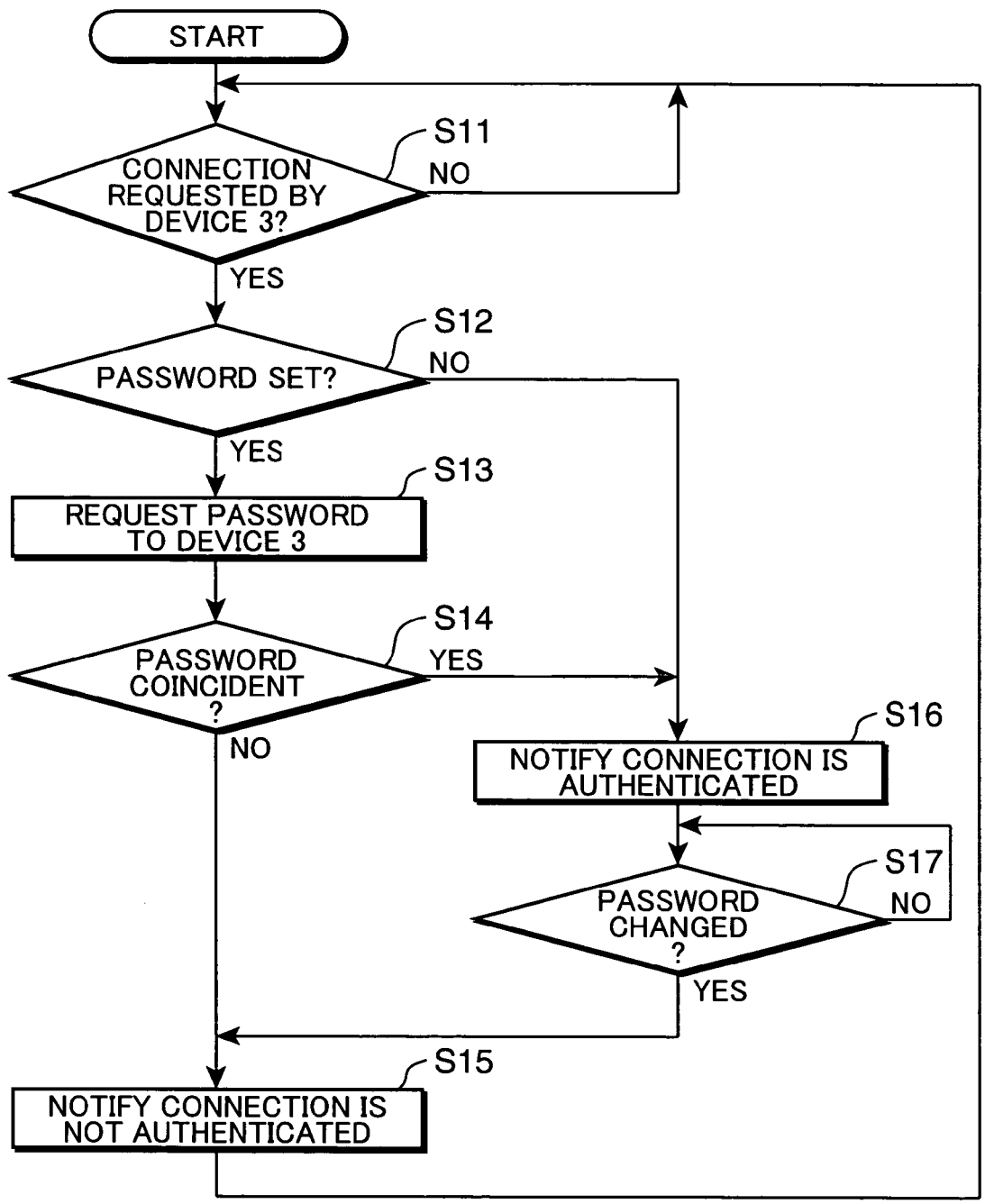
FIG. 9 is a flowchart showing a process of a wireless base station in the wireless communication system in accordance with the second embodiment of the present invention.
Figure 10:
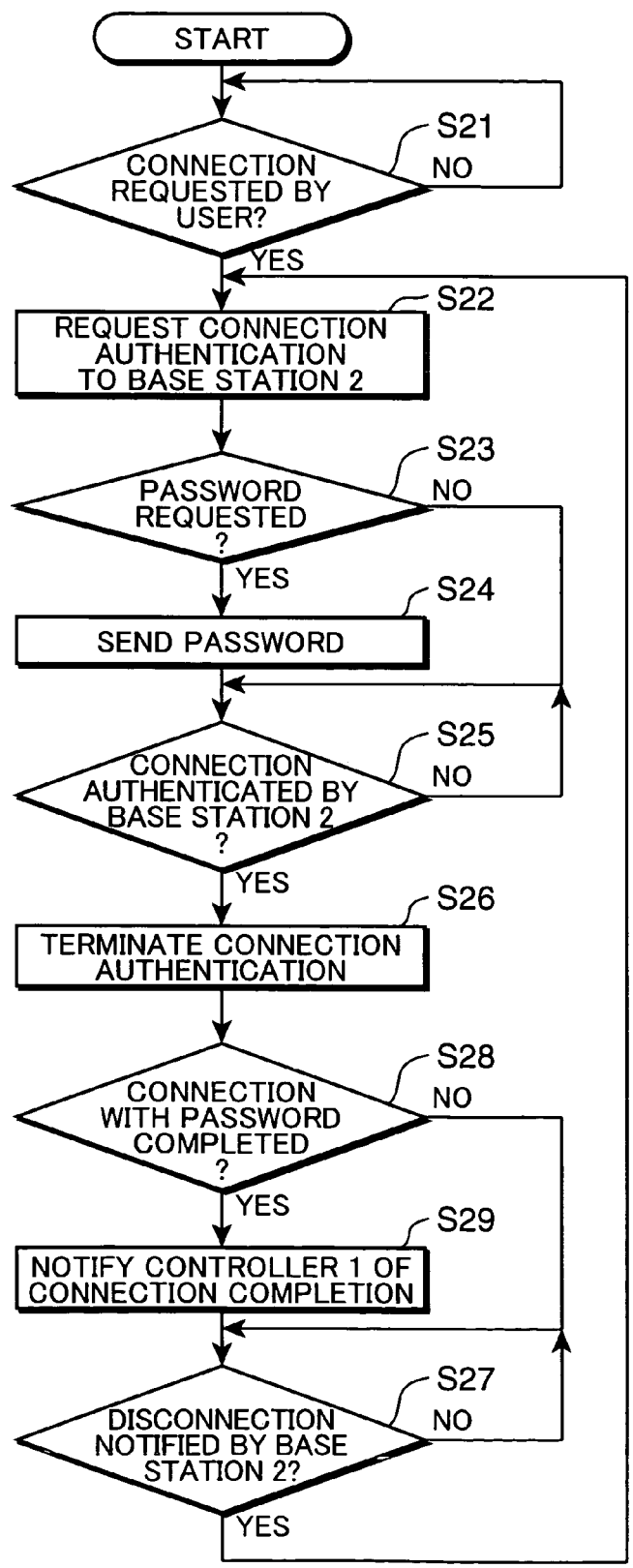
FIG. 10 is a flowchart showing a process of a wireless device in the wireless communication system in accordance with the second embodiment of the present invention.

FIG. 8 is a flowchart showing a process of the controller 1, FIG. 9 is a flowchart showing a process of the wireless base station 2, and FIG. 10 is a flowchart showing a process of the wireless device 3 in the second embodiment.

Elements shown in FIGS. 8 through 10 which are equivalent to those shown in FIGS. 2 through 4 are denoted at the same reference numerals, and description thereof will be omitted herein.

Referring to FIGS. 9 and 10, after a connection authenticating section 20 notifies a wireless connection authentication requesting section 31 that connection with a password has been authenticated (Step S16, YES in S25), the connection authentication process is terminated (Step S26). The connection authentication requesting section 31 notifies the connection authentication completion notifying section 33 of the connection authentication completion. Thereupon, the connection authentication completion notifying section 33 notifies the device registration completion notifying section 12, via the wireless base station 2, that the connection authentication with respect to the wireless device 3 has been completed (YES in Step S28, Step S29). Referring back to FIG. 8, the device registration completion notifying section 12 notifies the user of the connection authentication completion (YES in Step S06, Step S07).

In this way, the connection authentication completion notifying section 33 of the wireless device 3 notifies the controller 1 that the connection authentication by the wireless base station 2 has been completed. Upon receiving the completion notification, the device registration completion notifying section 12 of the controller 1 notifies the user that the connection authentication of the wireless device 3 by the wireless base station 2 has been completed. Since the user is notified that the connection authentication of the wireless station 3 by the wireless base station 2 has been completed through the device registration completion notifying section 12, the user can confirm, by way of the controller 1, whether the connection authentication of the wireless device 3 by the wireless base station 2 has been established.

Third Embodiment

Figure 11:
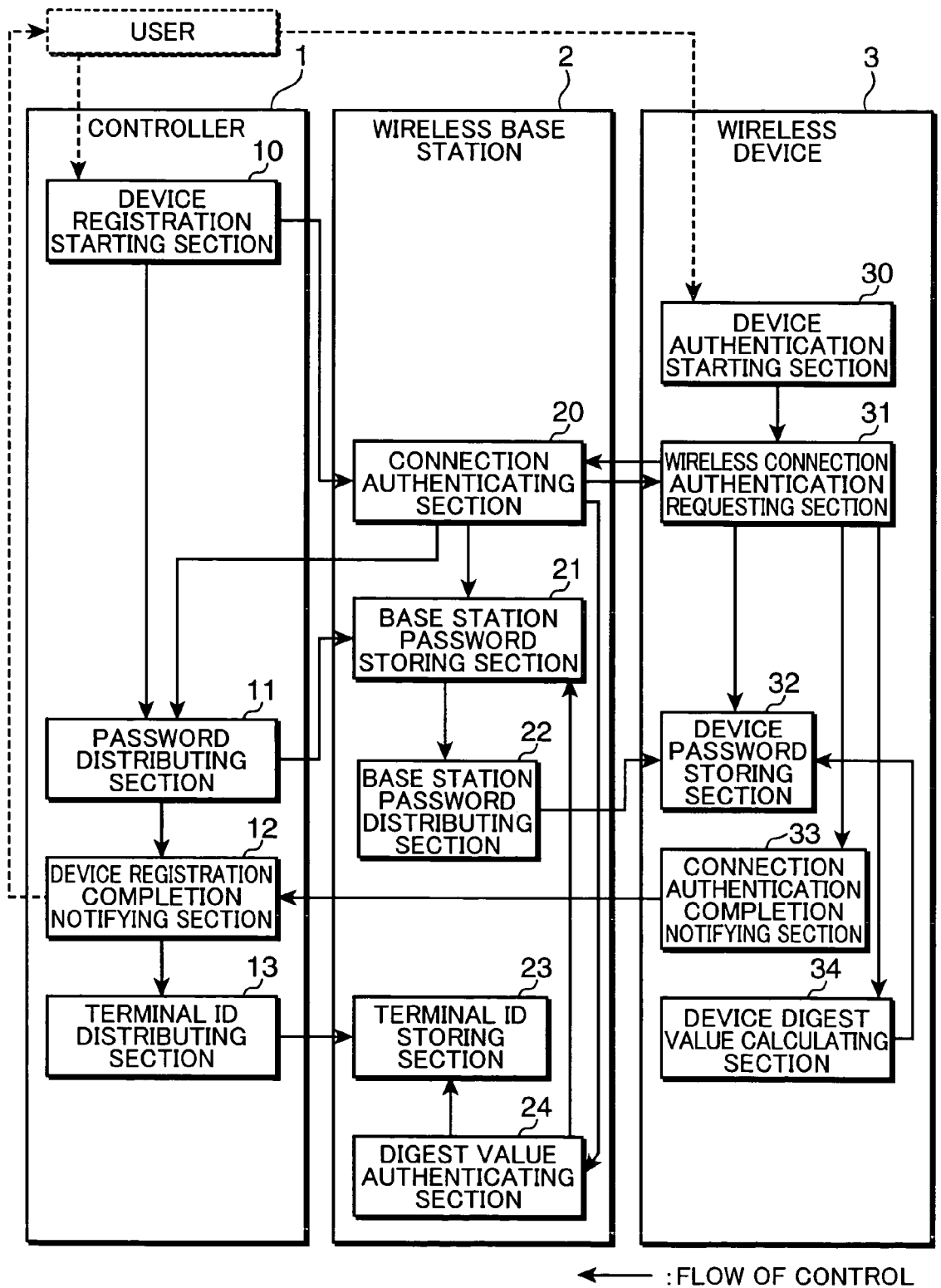
FIG. 11 is an illustration showing a configuration of a wireless communication system in accordance with a third embodiment of the present invention.

FIG. 11 is an illustration showing a third embodiment of the present invention. The third embodiment is different from the second embodiment in that a controller 1 is additionally provided with a terminal ID distributing section 13, a wireless base station 2 is additionally provided with a terminal ID storing section 23 and a digest value authenticating section 24, and a wireless device 3 is additionally provided with a device digest value calculating section 34. Elements in FIG. 11 which are equivalent to those shown in FIG. 7 are denoted at the same reference numerals, and description thereof will be omitted herein. Description will be provided concerning parts where the process in the third embodiment is different from that in the second embodiment.

The controller 1 includes the terminal ID distributing section 13 which stores a terminal ID (device identification information for identifying the device) sent from the wireless device 3, and sends the terminal ID to the wireless base station 2.

The wireless base station 2 includes the terminal ID storing section 23 and the digest value authenticating section 24. The terminal ID storing section 23 stores the terminal ID sent from the terminal ID distributing section 13 of the controller 1. The digest value authenticating section 24 calculates a digest value with use of a specified function by using the terminal ID stored in the terminal ID storing section 23, a password stored in a base station password storing section 21, and a random number sent from a wireless connection authentication requesting section 31, as input data, compares the calculated digest value with a digest value sent from the wireless device 3, and notifies a connection authenticating section 20 of the comparison result.

The wireless device 3 has the device digest value calculating section 34 which calculates a digest value with use of a specified function by using the terminal ID of identifying the wireless device 3, the password stored in a device password storing section 32, and the random number stored in the wireless device 3, as input data.

In this embodiment, the device digest value calculating section 34 is an example of device digest value calculating means, the wireless connection authentication requesting section 31 is an example of digest value distributing means, the terminal ID distributing section 13 is an example of device identification information distributing means, the terminal ID storing section 23 is an example of device identification information storing means, and the digest value authenticating means 24 is an example of digest value authenticating means.

The connection authenticating section 20 notifies a password distributing section 11 and the wireless connection authentication requesting section 31 that connection has been authenticated when connection without a password has been allowed in response to the first time connection authentication request. The wireless connection authentication requesting section 31 notifies the connection authentication completion notifying section 33 of the connection authentication. Upon receiving the connection authentication notification, the connection authentication completion notifying section 33 notifies, via the wireless base station 2, the device registration completion notifying section 12 of the terminal ID of identifying the wireless device 3. The device registration completion notifying section 12 notifies the terminal ID distributing section 13 of the terminal ID, and notifies the user of the connection authentication completion. The terminal ID distributing section 13 stores the terminal ID, and sends the same to the terminal ID storing section 23, which, in turn, stores the terminal ID.

The connection authenticating section 20 requests, from the wireless connection authentication requesting section 31, the terminal ID of identifying the wireless device 3, the random number, and the digest value, when connection with a password has been allowed in response to the second time connection authentication request. Upon receiving the request from the wireless connection authentication requesting section 31, the device digest value calculating section 34 calculates a digest value with use of the specified function by using the terminal ID of identifying the wireless device 3, the password stored in the device password storing section 32, and the random number stored in the wireless device 3, as input data. The wireless connection authentication requesting section 31 receives the terminal ID of identifying the wireless device 3, the random number, and the digest value from the device digest value calculating section 34, and sends the same to the connection authenticating section 20. Upon receiving the request from the connection authenticating section 20, the digest value authenticating section 24 calculates a digest value with use of the specified function by using the terminal ID stored in the terminal ID storing section 23, the password stored in the base station password storing section 21, and the random number sent from the wireless device 3, as input data. The digest value authenticating section 24 compares the calculated digest value with the digest value sent from the wireless connection authentication requesting section 31, and notifies the connection authenticating section 20 of the comparison result. If the comparison result indicates agreement, the connection authenticating section 20 notifies the wireless connection authentication requesting section 31 of connection authentication, thereby terminating the connection authentication process. Upon receiving the connection authentication completion notification from the wireless connection authentication requesting section 31, the connection authentication completion notifying section 33 notifies, via the wireless base station 2, the device registration completion notifying section 12 of the connection authentication completion. Then, the device registration completion notifying section 12 notifies the user that the device registration has been completed.

In this way, the connection authentication completion notifying section 33 notifies the controller 1 of the terminal ID of identifying the wireless device 3. The device digest value calculating section 34 of the wireless device 3 calculates the digest value with use of the specified function by using the terminal ID of identifying the wireless device 3, the password stored in the device password storing section 32, and the random number stored in the wireless device 3, as input data. The wireless connection authentication requesting section 31 distributes the calculated digest value and the random number to the wireless base station 2. The terminal ID distributing section 13 of the controller 1 distributes the terminal ID sent from the wireless device 3 to the wireless base station 2. The terminal ID storing section 23 of the wireless base station 2 stores the terminal ID distributed from the controller 1. The digest value authenticating section 24 calculates the digest value with use of the specified function by using the terminal ID, the password, and the random number sent from the wireless device 3, as input data, and compares the calculated digest value with the digest value sent from the wireless device 3. If it is judged that the calculated digest value coincides with the digest value sent from the wireless device 3, the connection authenticating section 20 authenticates connection of the wireless device 3.

Thus, the connection of the wireless device 3 with the wireless base station 2 is allowed based on a comparison between the digest value calculated in the wireless device 3 and the digest value calculated in the wireless base station 2, and based on a judgment as to whether the respective calculated digest values coincide with each other. This arrangement enhances security level of the connection between the wireless device 3 and the wireless base station 2.

Fourth Embodiment

Figure 12:
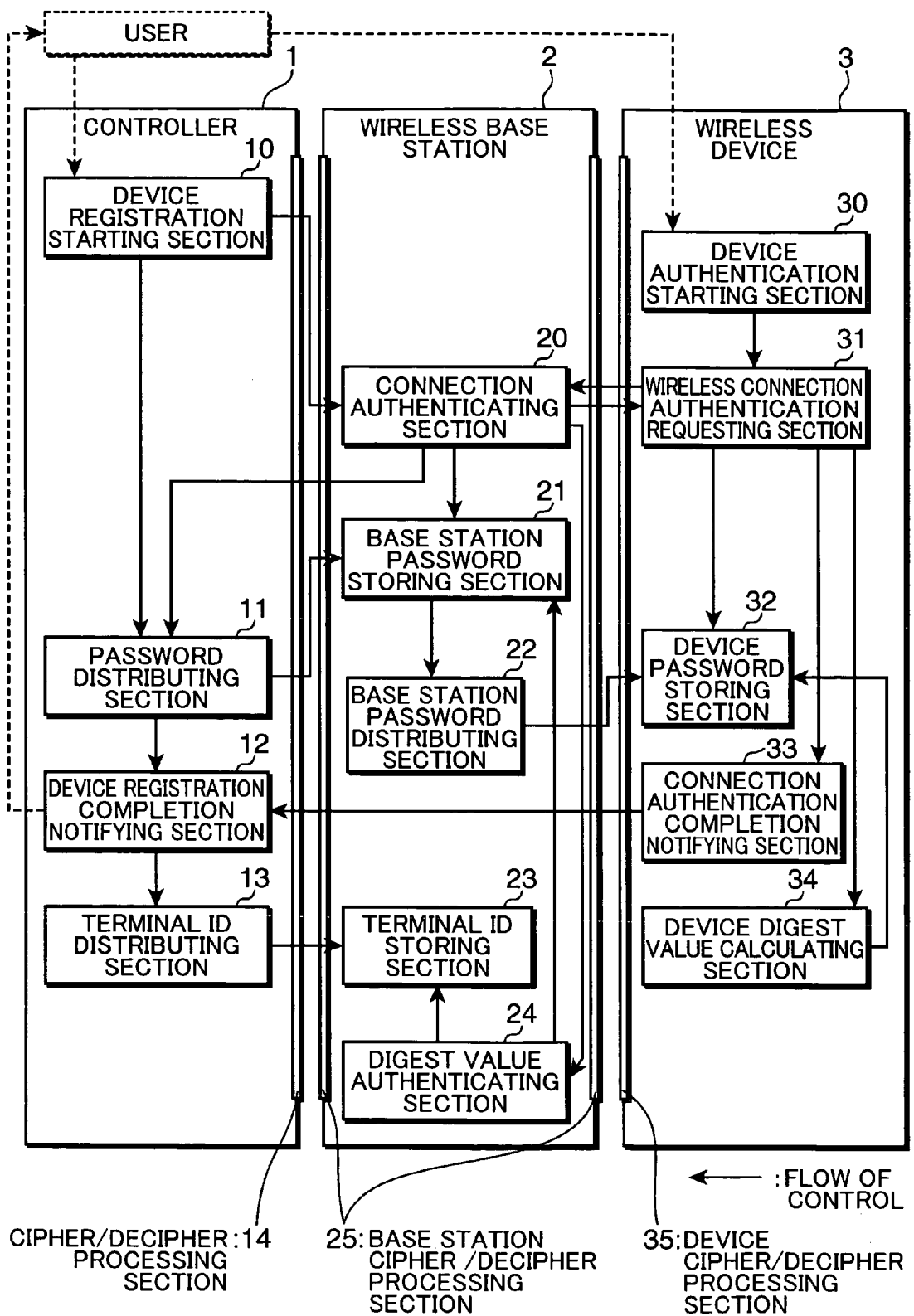
FIG. 12 is an illustration showing a configuration of a wireless communication system in accordance with a fourth embodiment of the present invention.

FIG. 12 is an illustration showing a fourth embodiment of the present invention. The fourth embodiment is different from the third embodiment in that a controller 1 is additionally provided with a cipher/decipher processing section 14, a wireless base station 2 is additionally provided with a base station cipher/decipher processing section 25, and a wireless device 3 is additionally provided with a device cipher/decipher processing section 35. Elements in FIG. 12 which are equivalent to those shown in FIG. 11 are denoted at the same reference numerals, and description thereof will be omitted herein.

In the fourth embodiment, the controller 1 has the cipher/decipher processing section 14, the wireless base station 2 has the base station cipher/decipher processing section 25, and the wireless device 3 has the device cipher/decipher processing section 35.

The cipher/decipher processing section 14 encrypts data to be sent from the controller 1, and decrypts data received in the controller 1. The base station cipher/decipher processing section 25 encrypts data to be sent from the wireless base station 2, and decrypts data received in the wireless base station 2. The device cipher/decipher processing section 35 encrypts data to be sent from the wireless device 3, and decrypts data received in the wireless device 3.

In this embodiment, the cipher/decipher processing section 14 is an example of authentication information encrypting means, and the device cipher/decipher processing section 35 is an example of authentication information decrypting means.

In this arrangement, an encrypted password is distributed from the controller 1, and is decrypted by the wireless device 3. Since the encrypted password is distributed from the controller 1, there is no likelihood that the password leaks in communication between the controller 1 and the wireless device 3.

Fifth Embodiment

Figure 13:
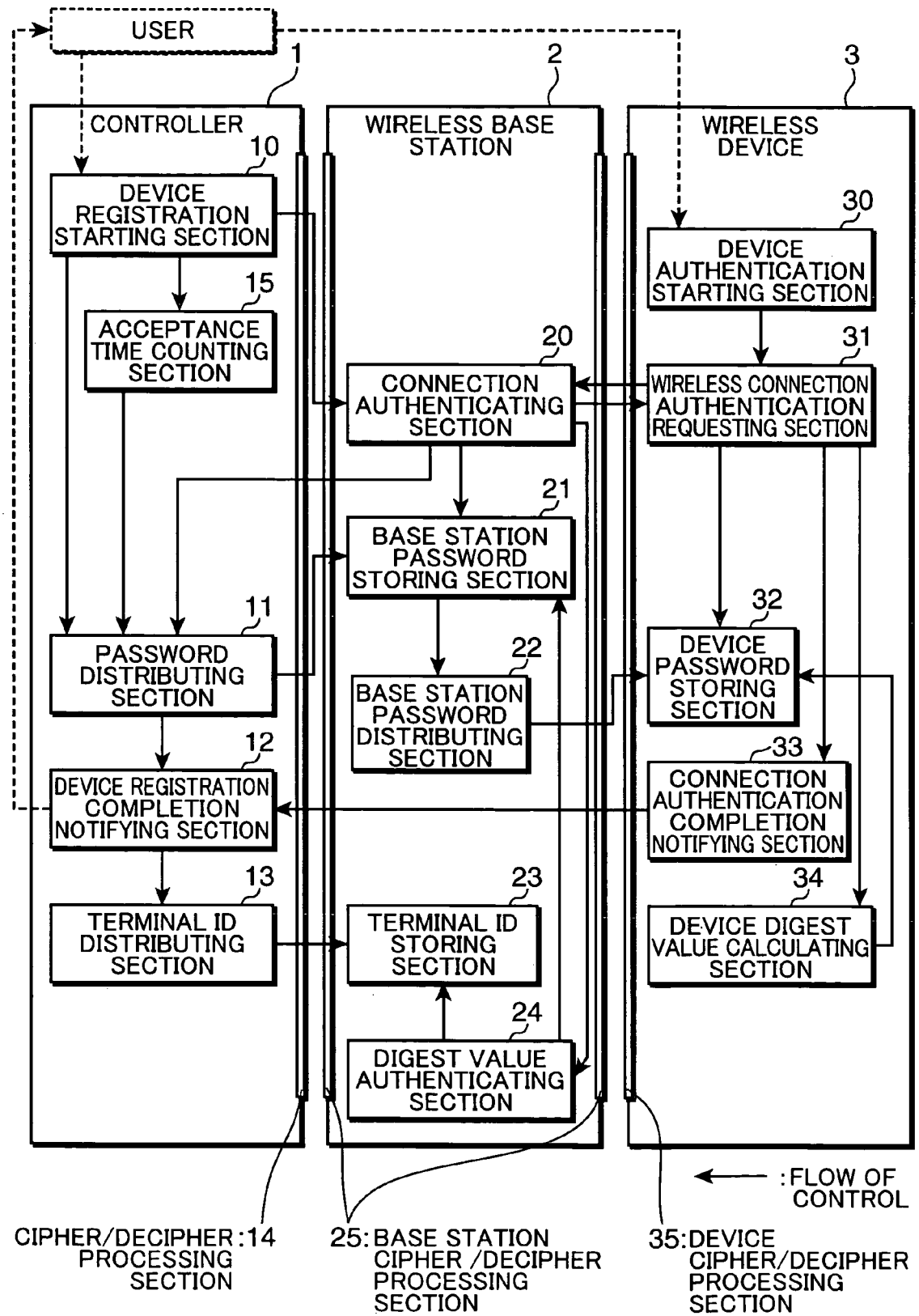
FIG. 13 is an illustration showing a configuration of a wireless communication system in accordance with a fifth embodiment of the present invention.

FIG. 13 is an illustration showing a fifth embodiment of the present invention. The fifth embodiment is different from the fourth embodiment in that a controller 1 is additionally provided with an acceptance time counting section 15. Elements in FIG. 13 which are equivalent to those shown in FIG. 12 are denoted at the same reference numerals, and description thereof will be omitted herein. In this embodiment, the acceptance time counting section 15 is an example of acceptance time counting means.

In this embodiment, the controller 1 has the acceptance time counting section 15. Upon receiving designation of registering a wireless device 3 by the user, a device registration starting section 10 controls the acceptance time counting section 15 to start counting a stand-by time (acceptance valid time). The acceptance time counting section 15 starts counting the stand-by time until a wireless base station 2 accepts a connection authentication request for the wireless device 3. Upon lapse of a certain time, the acceptance time counting section 15 stops counting the stand-by time, and notifies a password distributing section 11 that the stand-by time has lapsed. Upon receiving the notification, the password distributing section 11 distributes, to a base station password storing section 21, a password stored in the password distributing section 11. The base station password storing section 21 stores the password sent from the password distributing section 11, and notifies a connection authenticating section 20 that the password has been changed. The connection authenticating section 20, then, cancels the connection authentication to the wireless device 3 that has been connected with the wireless base station 2 without a password, disconnects the communication, and requests a wireless connection authentication requesting section 31 to terminate the on-going connection authentication process for the wireless device 3. The wireless connection authentication requesting section 31 suspends its stand-by operation for connection authentication, and is resumed to a state after start-up.

In this way, the acceptance time counting section 15 of the controller 1 counts a stand-by time until the connection authentication request from the wireless device 3 is accepted. If the counted time reaches the predetermined time, the password distributing section 11 distributes the password for identifying the wireless device 3 to the base station password storing section 21. In this arrangement, even if the controller 1 fails to receive, from the wireless base station 2, notification that the wireless base station 2 has accepted a connection authentication request from the wireless device 3, the password for identifying the wireless device 3 is securely distributed to the wireless base station 2 upon lapse of the predetermined time.

Sixth Embodiment

Figure 14:
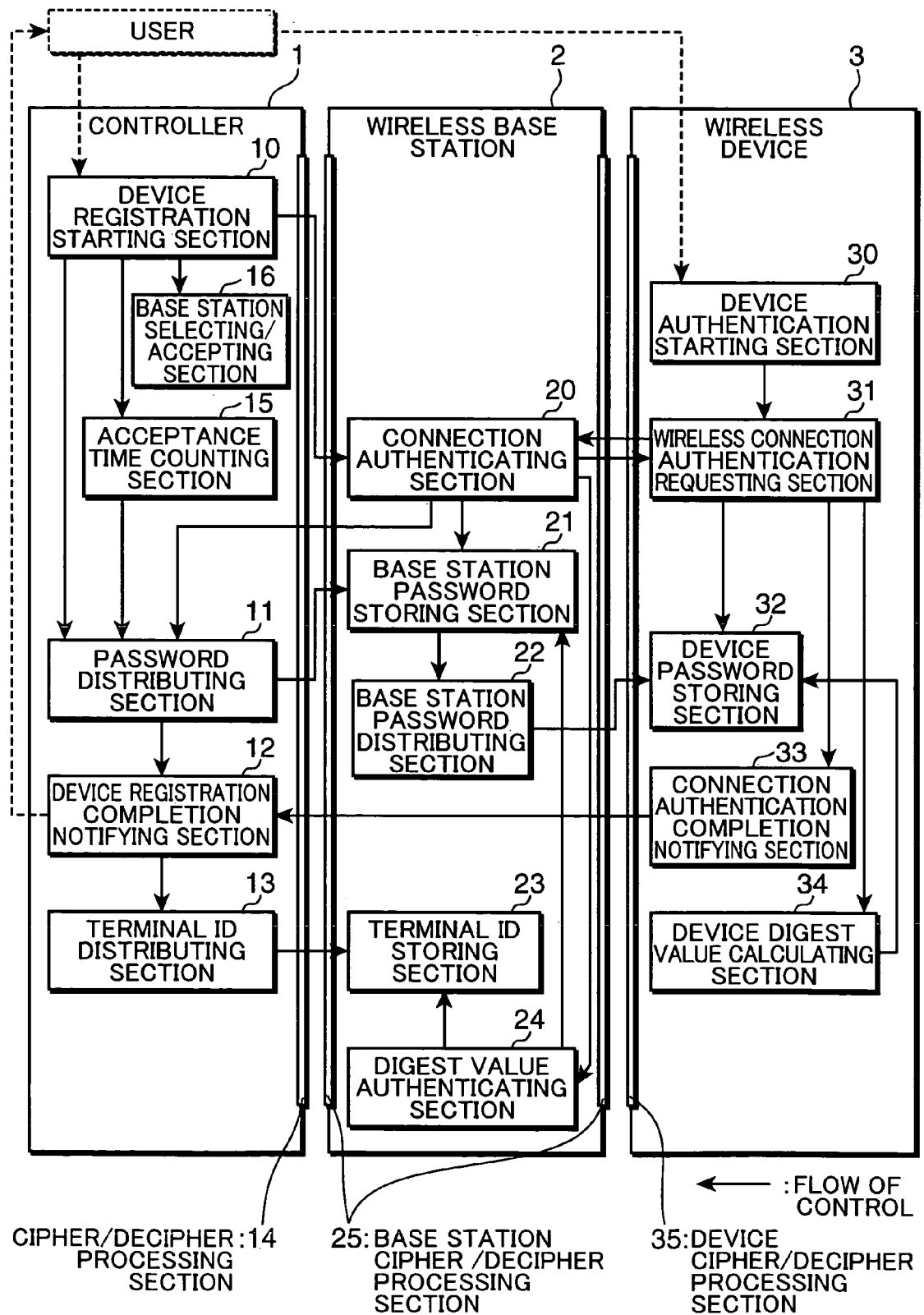
FIG. 14 is an illustration showing a configuration of a wireless communication system in accordance with a sixth embodiment of the present invention.

FIG. 14 is an illustration showing a sixth embodiment of the present invention. The sixth embodiment is different from the fifth embodiment in that a controller 1 is additionally provided with a wireless base station selecting/accepting section 16. Elements in FIG. 14 which are equivalent to those shown in FIG. 13 are denoted at the same reference numerals, and description thereof will be omitted herein. In this embodiment, the wireless base station selecting/accepting section 16 is an example of base station selecting/accepting means.

The controller 1 has the wireless base station selecting/accepting section 16. The wireless base station selecting/accepting section 16 is so configured that multiple base stations are connectable with the controller 1, wherein identification information of identifying the multiple wireless base stations are displayed in a list, so that the user is allowed to select one or more of the wireless base stations. The user selects one or more wireless base stations which he or she wants to authenticate connection with the target wireless device 3, from among the identification information of the multiple wireless base stations displayed in a list. In the case where connection with all the possible wireless base stations is accomplished by distributing, to these possible wireless base stations, information indicating that connection authentication has been established with respect to a single wireless base station, list-up display of identification information of the multiple wireless base stations, and selection of the wireless base station(s) by the user can be omitted.

The wireless base station selecting/accepting section 16 displays the multiple wireless base stations 2 connectable with the controller 1 in a list, and accepts selection of the wireless base station(s) 2 by the user from among the displayed multiple wireless base stations 2. This arrangement enables the user to select the wireless base station(s) 2 to be connected with the wireless device 3 from among the multiple wireless base stations 2, and eliminates likelihood that connection with multiple wireless devices may be localized at a single wireless base station, with the result that the communication system may suffer from heavy communication traffic.

Figure 15:
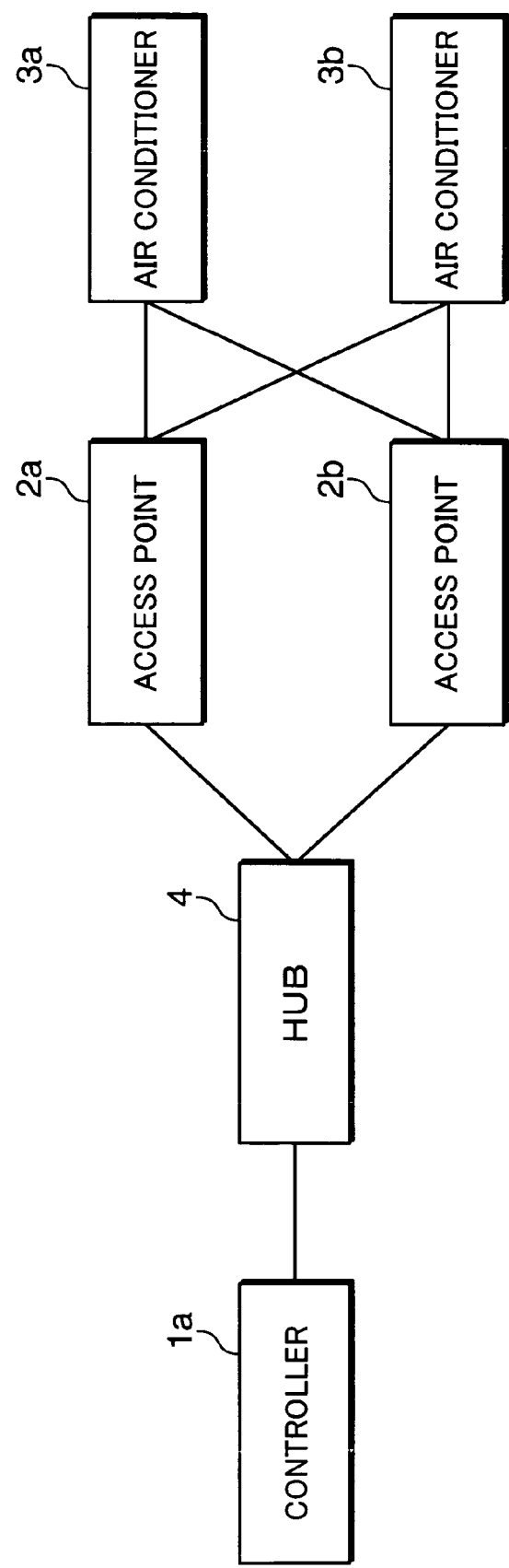
FIG. 15 is an illustration showing an arrangement of a wireless communication system comprised of a controller, multiple wireless base stations, and multiple wireless devices.

FIG. 15 is an illustration showing a configuration of a wireless communication system comprised of a controller, multiple wireless base stations, and multiple wireless devices. The wireless communication system as shown in FIG. 15 is provided with a controller 1*a*, access points 2*a*, 2*b*, which are examples of the wireless base station apparatus, air conditioners 3*a*, 3*b*, which are examples of the wireless device, and a hub 4. The controller 1*a* and the hub 4 are connected with each other according to e.g., Ethernet® standard or the like, and each of the access points 2*a*, 2*b*, and the hub 4 are connected with each other according to e.g., Ethernet® standard or the like. Each of the air conditioners 3*a*, 3*b*, and each of the access points 2*a*, 2*b* are communicatively connected with each other wirelessly by way of Bluetooth or a like technology. The arrangement of the controller 1*a* is identical to that of the controller 1 as shown in FIG. 14. The arrangement of the access point 2*a* (2*b*) is identical to that of the wireless base station 2 as shown in FIG. 14. The arrangement of the air conditioner 3*a* (3*b*) is identical to that of the wireless device 3 as shown in FIG. 14. Therefore, description on the controller 1*a*, the access points 2*a*, 2*b*, and the air conditioners 3*a*, 3*b* will be omitted herein.

Figure 16:
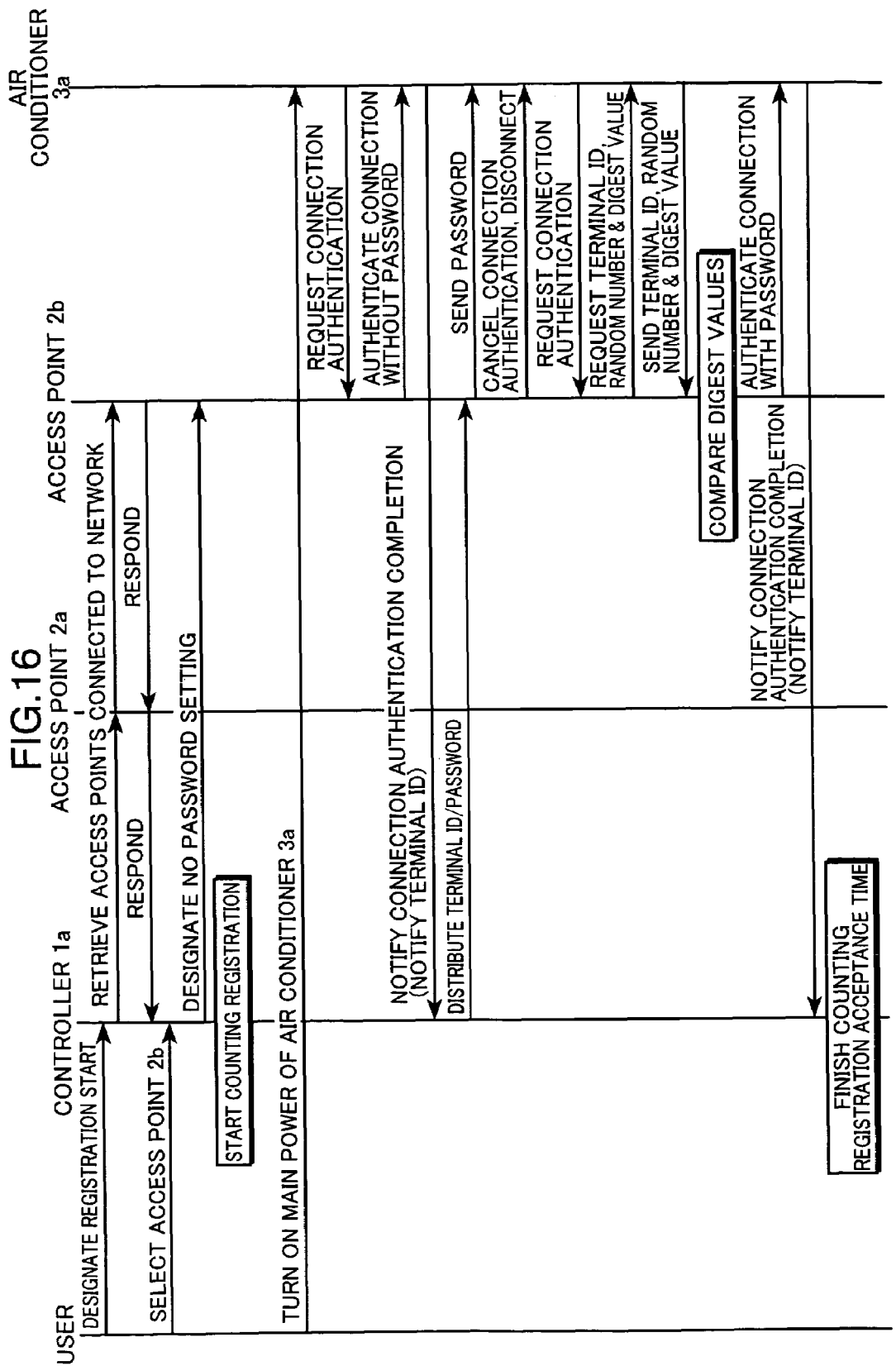
FIG. 16 is an illustration for explaining an operation of the wireless communication system in accordance with the sixth embodiment of the present invention.

In the following, described is a case where the air conditioner 3*a* is registered in the access point 2*a*. FIG. 16 is an illustration for explaining an operation of the wireless communication system in accordance with the sixth embodiment of the present invention.

First, the user designates start of registration of the air conditioner 3*a* by manipulating an input device provided on the controller 1*a*. A device registration starting section 30 accepts the registration start designated by the user. Then, the device registration starting section 10 retrieves the access point connected with the network. Each of the access points 2*a*, 2*b* responds to the retrieval request from the controller 1*a*. The controller 1*a* has a display device on which the access points currently connected with the network are displayed based on the response from each of the access points 2*a*, 2*b*. The user selects an access point to be connected with the air conditioner 3*a* from among the displayed access points. In this example, since the air conditioner 3*a* is registered in the access point 2*b*, the user selects the access point 2*b* from among the displayed access points which are currently connected with the network.

Next, a password distributing section 11 designates no password setting in a base station password storing section 21 of the access point 2*b*. Then, an acceptance time counting section 15 starts counting an acceptance valid time until the registration is accepted. In this embodiment, a time duration from start of counting the acceptance valid time to end of counting the acceptance valid time is set to e.g., 3 minutes.

When the main power of the air conditioner 3*a* is turned on by the user, a wireless connection authentication requesting section 31 of the air conditioner 3*a* sends connection authentication request data to the access point 2*b*. Upon receiving the connection authentication request data from the wireless connection authentication requesting section 31, a connection authenticating section 20 of the access point 2*b* reads out the password stored in the base station password storing section 21, and allows connection with the air conditioner 3*a* without a password, if it is judged that no password is set (stored) in the password storing section 21.

A connection authentication completion notifying section 33 of the air conditioner 3*a* notifies a device registration completion notifying section 12 of the controller 1*a* that the connection authentication process has been terminated. Thereupon, the connection authentication completion notifying section 33 sends, to the controller 1*a*, a terminal ID of identifying the air conditioner 3*a*. The device registration completion notifying section 12 of the controller 1*a* notifies a terminal ID distributing section 13 of the terminal ID of identifying the air conditioner 3*a* for storage therein. The terminal ID is also sent to a terminal ID storing section 23 of the access point 2*b* for storage therein. The password distributing section 11 of the controller 1*a* sends the password, which has been stored in advance in the password distributing section 11, to the base station password storing section 21 of the access point 2*b* for storage therein. A base station password distributing section 22 of the access point 2*b* sends, to a device password storing section 32 of the air conditioner 3*a*, the password that has been sent from the password distributing section 11 and stored in the base station password storing section 21 for storage therein. The connection authenticating section 20 of the access point 2*b*, then, cancels the connection authentication process with respect to the air conditioner 3*a* that has been connected with the access point 2*b* without the password, disconnects the communication, and requests the wireless connection authentication requesting section 31 to terminate the on-going connection authentication process for the air conditioner 3*a*.

Upon receiving the notification that the connection authentication process by the access point 2*b* is canceled, the wireless connection authentication requesting section 31 of the air conditioner 3*a* sends the connection authentication request data to the access point 2*b* again.

When the connection with the password is allowed in response to the second time connection authentication request, the connection authenticating section 20 of the access point 2*b* requests, from the wireless connection authentication requesting section 31, the terminal ID of identifying the air conditioner 3*a*, a random number, and a digest value. In response to accepting the request from the connection authenticating section 20, the wireless connection authentication requesting section 31 controls a device digest value calculating section 34 to calculate a digest value with use of a specified function by using the terminal ID of identifying the air conditioner 3*a*, the password stored in the device password storing section 32, and the random number stored in the air conditioner 3*a*, as input data. The wireless connection authentication requesting section 31 receives, from the device digest value calculating section 34, the terminal ID of identifying the air conditioner 3*a*, the random number, and the calculated digest value, and sends the same to the connection authenticating section 20 of the access point 2*b*.

Upon receiving the request from the connection authenticating section 20, a digest value authenticating section 24 calculates a digest value with use of a specified function by using the terminal ID of identifying the air conditioner 3*a* which has been stored in the terminal ID storing section 23, the password stored in the base station password storing section 21, and the random number sent from the air conditioner 3*a*, as input data. Then, the digest value authenticating section 24 compares the calculated digest value with the digest value sent from the wireless connection authentication requesting section 31, and sends the comparison result to the connection authenticating section 20. If the comparison result indicates agreement, the connection authenticating section 20 notifies the wireless connection authentication requesting section 31 of the air conditioner 3*a* that the connection with the air conditioner 3*a* has been authenticated. Thus, the connection authentication process is finalized.

Upon receiving the connection authentication completion notification from the wireless connection authentication requesting section 31 of the air conditioner 3*a*, the connection authentication completion notifying section 33 of the air conditioner 3a notifies the device registration completion notifying section 12 of the controller 1a, via the access point 2b, that the connection authentication process has been completed. Then, the device registration completion notifying section 12 notifies the user that the requested device (air conditioner 3a) has been registered by displaying, on the display device, a message indicating that the air conditioner 3a has been registered in the access point 2b.

FIGS. 17A and 17B are illustrations showing examples of an address table stored in the access point. FIG. 17A shows an example of the address table stored in the access point 2b until connection with a password is authenticated. FIG. 17B shows an example of the address table stored in the access point 2b after the connection with the password has been authenticated. As shown in FIGS. 17A and 17B, each address table stores addresses unique to the wireless devices, and corresponding link keys in association with each other. As shown in FIG. 17A, until connection with the air conditioner 3a is authenticated, the access point 2b merely stores data "A36B35", which is the address unique to the air conditioner 3a, with no link key being stored. When the connection with the air conditioner 3a is authenticated, the access point 2b creates a link key for the air conditioner 3a. The created link key is stored in the access point 2b in association with the unique address of the air conditioner 3a. Thus, as shown in FIG. 17B, the access point 2b stores the unique address "A36B35" of the air conditioner 3a, and the link key "23bc" in association with each other. The connection of the air conditioner 3a via the access point 2b is authenticated with use of the address table shown in FIG. 17B.

In each of the foregoing embodiments, the wireless base station 2 and the wireless device 3 are connected with each other wirelessly. Alternatively, the wireless base station 2 and the wireless device 3 may be wire-connected with each other.

To summarize the present invention, according to an aspect of the present invention, a communication system is provided with a base station apparatus, a controller connected with the base station apparatus, and a device which is operative to require authentication for connection with the base station apparatus. The controller includes: device registration starting means which starts registration of the device; and authentication information distributing means which distributes, to the base station apparatus, authentication information determined by the controller. The base station apparatus includes: base station authentication information storing means which stores the authentication information distributed by the authentication information distributing means; base station authentication information distributing means which distributes, to the device, the authentication information stored in the base station authentication information storing means; and connection authenticating means which authenticates connection with the device. The device includes: device authentication starting means which starts requesting authentication for connection with the base station apparatus; device authentication information storing means which stores the authentication information distributed by the base station authentication information distributing means; and connection authentication requesting means which requests the connection authentication from the base station apparatus. The connection authenticating means requests the authentication information from the device in response to accepting the connection authentication request by the connection authentication requesting means, the connection authentication requesting means reads out the authentication information stored in the device authentication information storing means and sends the readout authentication information to the base station apparatus in response to accepting the authentication information request by the connection authenticating means, and the connection authenticating means receives the authentication information sent from the connection authentication requesting means, and authenticates connection with the device if it is judged that the received authentication information coincides with the authentication information stored in the base station authentication information storing means.

In the above arrangement, in response to start of the device registration by the device registration starting means of the controller, the authentication information distributing means distributes the authentication information determined by the controller to the base station apparatus. The authentication information distributed by the authentication information distributing means is stored in the base station authentication information storing means. The authentication information stored in the base station authentication information storing means is distributed to the device by the base station authentication information distributing means. The authentication information distributed by the base station authentication information distributing means is stored in the device authentication information storing means of the device. In response to the start of requesting connection authentication by the device authentication starting means of the device, the connection authentication requesting means requests the connection authentication from the base station apparatus. When the connection authenticating means accepts the connection authentication request by the connection authentication requesting means, the connection authenticating means requests the authentication information from the device. When the connection authentication requesting means accepts the authentication information request by the connection authenticating means, the authentication information is read out from the device authentication information storing means, and the readout authentication information is sent to the base station apparatus. The connection authenticating means receives the authentication information sent from the connection authentication requesting means, and authenticates connection with the device if it is judged that the received authentication information coincides with the authentication information stored in the base station authentication information storing means.

In this way, in response to the connection request from the device, the controller distributes the authentication information for identifying the device to the base station apparatus for storage therein. The authentication information is also distributed to the device for storage therein. The connection authentication between the base station apparatus and the device is established with use of the authentication information. This arrangement semi-automatically establishes connection authentication of the specific device, without need of a cumbersome operation by a user of entering a password, a PIN code, or the like.

It is preferable that the base station apparatus and the device are communicatively connected with each other by wireless communication. In this arrangement, since the base station apparatus and the device are communicatively connected with each other by wireless communication, the present invention is applicable to a wireless communication demanding high security level.

Preferably, the authentication information is a password in the communication system. In this arrangement, the password is usable as the authentication information determined by the controller.

Preferably, the connection authenticating means authenticates connection with the device without the authentication information in response to accepting the connection authentication request by the connection authentication requesting means prior to authentication, and disconnects the connection with the device in response to distribution of the authentication information by the base station authentication information distributing means to the device.

In the above arrangement, in response to accepting the connection authentication request by the connection authentication requesting means prior to authentication, the connection authenticating means authenticates connection with the device without the authentication information. On the other hand, the connection authenticating means disconnects the connection with the device in response to distribution of the authentication information by the base station authentication information distributing means to the device. Then, in response to accepting the connection authentication request by the connection authentication requesting means for the second time, the connection authenticating means requests the authentication information from the device. In response to accepting the authentication information request by the connection authenticating means, the connection authentication requesting means reads out the authentication information stored in the device authentication information storing means, and sends the readout authentication information to the base station apparatus. The connection authenticating means receives the authentication information sent from the connection authentication requesting means, and authenticates connection with the device if it is judged that the received authentication information coincides with the authentication information stored in the base station authentication information storing means.

In this way, in the case where the authentication information is not set for the device, the base station apparatus and the device are connected with each other without the authentication information, whereas in the case where the authentication information is set for the device, the connection between the base station apparatus and the device is disconnected. This arrangement enables a connection between the base station apparatus and the device, even if the authentication information is not set for the device.

Preferably, the controller further includes authentication mode switching means which switches over the authentication mode of the base station apparatus for connection authentication between an authentication activated mode and an authentication non-activated mode, and the base station apparatus further includes authentication mode storing means which stores the authentication mode designated by the authentication mode switching means, the authentication mode switching means switches over the authentication mode of the base station apparatus to the authentication non-activated mode in response to accepting a connection authentication request by the connection authentication requesting means prior to authentication, and switches over the authentication mode of the base station apparatus to the authentication activated mode in response to accepting a second time connection authentication request and thereafter by the connection authentication requesting means and, further, the connection authenticating means determines whether the authentication information be requested from the device, depending on the authentication mode stored in the authentication mode storing means, in response to accepting the connection authentication request by the connection authentication requesting means.

In the above arrangement, the authentication mode switching means switches over the authentication mode of the base station apparatus for connection authentication between the authentication activated mode and the authentication non-activated mode, and the authentication mode storing means stores the designated authentication mode. In response to accepting the connection authentication request by the connection authentication requesting means prior to authentication, the authentication mode switching means switches over the authentication mode to the authentication non-activated mode. On the other hand, in response to accepting the connection authentication request by the connection authentication requesting means for the second time and thereafter, the authentication mode switching means switches over the authentication mode to the authentication activated mode. In response to accepting the connection authentication request by the connection authentication requesting means, the connection authenticating means determines whether the authentication information be requested from the device, depending on the designated authentication mode.

In this way, switching over the authentication mode makes it possible for the user to recognize a current status of the device, namely, whether the device is in a state where the authentication information is not set, and accordingly, authentication is made without the authentication information, or whether the device is in a state where the authentication information is set, and accordingly, authentication is made based on the authentication information. Judgment as to whether the base station apparatus should request the authentication information from the device can be made based on the designated authentication mode.

Preferably, the device further includes connection authentication completion notifying means which notifies the controller that the connection authentication by the base station apparatus has been completed, and the controller further includes device registration completion notifying means which notifies the user of the connection authentication completion notification in response to receiving the notification from the connection authentication completion notifying means.

In the above arrangement, the connection authentication completion notifying means of the device notifies the controller that the connection authentication by the base station apparatus has been completed. The device registration completion notifying means of the controller notifies the user that the connection authentication has been completed in response to receiving the notification from the connection authentication completion notifying means. Thus, since the user is notified that the connection authentication of the device by the base station apparatus has been completed by the device registration completion notifying means, the user can confirm through the controller whether the connection authentication of the device by the base station apparatus has been completed.

Preferably, the connection authentication completion notifying means notifies the controller of device identification information of identifying the device. The device further includes device digest value calculating means which calculates a digest value with use of a specified function by using the device identification information of identifying the device, the authentication information stored in the device authentication information storing means, and a predetermined random number stored in the device, as input data, and digest value distributing means which distributes, to the base station apparatus, the digest value calculated by the device digest value calculating means, and the predetermined random number. The controller further includes device identification information distributing means which distributes, to the base station apparatus, the device identification information sent from the device. The base station apparatus further includes device identification information storing means which stores the device identification information distributed from the controller, and digest value authenticating means which calculates a digest value with use of a specified function by using the device identification information stored in the device identification information storing means, the authentication information stored in the base station authentication information storing means, and the random number sent from the device, as input data, and compares the calculated digest value with the digest value sent from the device. The connection authenticating means authenticates connection with the device if the digest value authenticating means judges that the calculated digest value coincides with the digest value sent from the device.

In the above arrangement, the connection authentication completion notifying means notifies the controller of the device identification information of identifying the device. The device digest value calculating means of the device calculates the digest value with use of the specified function by using the device identification information of identifying the device, the authentication information stored in the device authentication information storing means, and the predetermined random number stored in the device, as input data. The digest value distributing means distributes the calculated digest value and the random number to the base station apparatus. The device identification information distributing means of the controller distributes, to the base station apparatus, the device identification information sent from the device. The device identification information storing means of the base station apparatus stores the device identification information distributed from the controller. The digest value authenticating means calculates the digest value with use of the specified function by using the device identification information, the authentication information, and the random number sent from the device, as input data, and compares the calculated digest value with the digest value sent from the device. The connection authenticating means authenticates the connection with the device if it its judged that the calculated digest value coincides with the digest value sent from the device.

In this way, the digest value calculated in the device, and the digest value calculated in the base station apparatus are compared with each other, and the connection authentication of the device is determined based on a judgment as to whether the calculated digest values coincide with each other. This arrangement enables to enhance security level of the connection between the device and the base station apparatus.

Preferably, the controller further includes authentication information encrypting means which encrypts the authentication information, and the device further includes authentication information decrypting means which decrypts the encrypted authentication information distributed from the controller.

In the above arrangement, the encrypted authentication information is distributed from the controller, and is decrypted by the device. Since the controller distributes the encrypted authentication information, there is no likelihood that the authentication information may leak in the communication between the controller and the device.

Preferably, the controller further includes acceptance time counting means which counts a time for accepting the connection authentication request from the device, and the authentication information distributing means distributes the authentication information of the device if the time counted by the acceptance time counting means reaches a predetermined time.

In the above arrangement, the acceptance time counting means of the controller counts the time for accepting the connection authentication request from the device, and the authentication information distributing means distributes the authentication information of the device if the time counted by the acceptance time counting means reaches the predetermined time. This arrangement enables the distribution of the authentication information of the device upon lapse of the predetermined time, even if the controller is not notified that the base station apparatus has accepted the connection authentication request from the device.

Preferably, the connection authenticating means of the base station apparatus does not authenticate connection if the connection authentication request is sent from a plurality of the devices.

In the above arrangement, if the connection authenticating means has received the connection authentication request from the plurality of the devices, the connection authenticating means does not authenticate connection. This arrangement eliminates likelihood that the authentication information may be set in a device other than the device of which the user wishes registration, and the other device may be registered.

Preferably, the controller further includes base station selecting/accepting means which displays the multiple base station apparatuses connectable with the controller in a list, and allows the user to select the base station apparatus from among the displayed multiple base station apparatuses.

In the above arrangement, the base station selecting/accepting means displays the possible multiple base station apparatuses connectable with the controller in a list, and the user is allowed to select the base station apparatus from among the displayed multiple base station apparatuses. Thus, since the user is allowed to select the base station apparatus with which the user wishes to connect the device, there is no likelihood that connection with multiple devices may be localized at a single base station apparatus, with the result that the communication system may suffer from heavy communication traffic.

According to another aspect of the present invention, a communication method used for a communication system is provided with a base station apparatus, a controller connectable with the base station apparatus, and a device which is operative to request authentication for connection with the base station apparatus. A step for the controller to start registration of the device in response to designation by a user; and a step for the controller to distribute, to the base station apparatus, authentication information determined by the controller. A step for the base station apparatus to store authentication information which is to be distributed in the authentication information distributing step; a step for the base station apparatus to distribute, to the device, the authentication information which is be stored in the base station authentication information storing step; and a step for the base station apparatus to authenticate connection with the device. A step for the device to start request of authentication for connection with the base station apparatus in response to designation by the user; a step for the device to store the authentication information distributed from the controller; and a step for the device to request the connection authentication from the base station apparatus. In the connection authenticating step, the base station apparatus requests the authentication information from the device in response to accepting the connection authentication request in the connection authentication requesting step, in the connection authentication requesting step, the device reads out the authentication information stored in the device authentication information storing step, and sends the readout authentication information to the base station apparatus in response to accepting the authentication information request in the connection authenticating step, and in the connection authenticating step, the base station apparatus receives the authentication information sent in the connection authentication requesting step, and authenticates the connection with the device if it is judged that the received authentication information coincides with the authentication information stored in the base station authentication information storing step.

In the above arrangement, in response to start of registration of the device in the device registration starting step of the controller, the authentication information determined by the controller is distributed to the base station apparatus in the authentication information storing step. The authentication information distributed in the authentication information distributing step is stored in the base station authentication information distributing step. The authentication information stored in the base station authentication information storing step is distributed to the device in the base station authentication information distributing step. The authentication information distributed in the base station authentication information distributing step is stored in the device authentication information storing step of the device. In response to the start of the connection authentication request in the device authentication starting step of the device, the connection authentication is requested from the base station apparatus in the connection authentication requesting step. In response to accepting the connection authentication request in the connection authentication requesting step, in the connection authenticating step, the authentication information is requested from the device. In response to accepting the authentication information request in the connection authenticating step, in the connection authentication requesting step, the authentication information stored in the device authentication information storing step is read out, and the readout authentication information is sent to the base station apparatus. In the connection authenticating step, the authentication information sent in the connection authentication requesting step is received, and the connection with the device is authenticated if it is judged that the received authentication information coincides with the authentication information stored in the base station authentication information storing step.

In this way, in response to the connection request from the device, the controller distributes the authentication information of the device to the base station apparatus for storage therein. The authentication information is also distributed to the device for storage therein. Since the connection authentication between the device and the base station apparatus is established with use of the authentication information, the connection authentication of the specific device is semi-automatically established without need of a cumbersome operation by the user of entering a password, a PIN code or the like.

Preferably, in the connection authenticating step, the base station apparatus authenticates the connection with the device without the authentication information in response to accepting a connection authentication request in the connection authentication requesting step prior to authentication, and disconnects the connection with the device in response to distribution of the authentication information to the device in the base station authentication information distributing step.

In the above arrangement, in response to accepting the connection authentication request in the connection authentication requesting step prior to authentication, the connection with the device is authenticated without the authentication information, and the connection with the device is disconnected in response to distribution of the authentication information to the device in the base station authentication information distributing step. In response to re-accepting the connection authentication request in the connection authentication requesting step, the authentication information is requested from the device. In the connection authentication requesting step, in response to accepting the authentication connection request in the connection authenticating step, the authentication information stored in the device authentication information storing step is read out, and the readout authentication information is sent to the base station apparatus. In the connection authenticating step, the authentication information sent in the connection authentication requesting step is received, and connection with the device is authenticated if it is judged that the received authentication information coincides with the authentication information stored in the base station authentication information storing step.

In this way, if the authentication information is not set for the device, the base station apparatus and the device are connected with each other without the authentication information. On the other hand, if the authentication information is set for the device, the connection between the base station apparatus and the device is disconnected. This arrangement enables a connection to be established between the base station apparatus and the device even if the authentication information is not set for the device.

Preferably, a step for the controller to switch over the authentication mode of the base station apparatus for connection authentication between an authentication activated mode and an authentication non-activated mode. A step for the base station apparatus to store the authentication mode designated in the authentication mode switching step. In the authentication mode switching step, the controller switches over the authentication mode of the base station apparatus to the authentication non-activated mode in response to accepting a connection authentication request in the connection authentication requesting step prior to authentication, and switches over the authentication mode of the base station apparatus to the authentication activated mode in response accepting a second time connection authentication request and thereafter in the connection authentication requesting step, and in the connection authenticating step, the base station apparatus determines whether the authentication information be requested from the device, depending on the authentication mode stored in the authentication mode storing step in response to accepting the connection authentication request in the connection authentication requesting step.

In the above arrangement, in the authentication mode switching step, the authentication mode of the base station apparatus for connection authentication is switched over between the authentication activated mode and the authentication non-activated mode. In the authentication mode storing step, the authentication mode designated in the authentication mode switching step is stored. In response to accepting the connection authentication request in the connection authentication requesting step prior to authentication, the authentication mode of the base station apparatus is switched over to the authentication non-activated mode. On the other hand, the authentication mode is switched over to the authentication activated mode in response accepting the second time connection authentication request and thereafter in the connection authentication requesting step. In the connection authenticating step, in response to accepting the connection authentication request in the connection authentication requesting step, it is determined as to whether the authentication information be requested from the device, depending on the authentication mode stored in the authentication mode storing step.

In this way, switching over the authentication mode makes it possible for the user to recognize a current status of the device, namely, whether the device is in a state where the authentication information is not set, and accordingly, (i) authentication is made without the authentication information, or a state where the authentication information is set, and (ii) authentication is made based on the authentication information. Judgment as to whether the base station apparatus should request the authentication information from the device can be made based on the designated authentication mode.

Preferably, a step for the device to notify the controller that the connection authentication by the base station apparatus has been completed, and a step for the controller to notify the user that the device has been registered in the base station apparatus in response to receiving the connection authentication completion notification in the connection authentication completion notifying step.

In the above arrangement, in the connection authentication completion notifying step of the device, the controller is notified that the connection authentication by the base station apparatus has been completed, and in the device registration completion notifying step of the controller, the user is notified that the connection authentication of the device by the base station apparatus has been completed in response to receiving the connection authentication completion notification in the connection authentication completion notifying step. Thus, since the user is notified that the connection authentication of the device by the base station apparatus has been completed in the device registration completion notifying step, the user can confirm through the controller whether the connection authentication of the device by the base station apparatus has been completed.

Preferably, in the connection authentication completion notifying step, the device notifies the controller of device identification information of identifying the device. A step for the device to calculate a digest value with use of a specified function by using the device identification information of identifying the device, the authentication information stored in the device authentication information storing step, and a predetermined random number stored in the device, as input data, and a digest value distributing step of distributing, to the base station apparatus, the digest value calculated in the device digest value calculating step, and the random number. A step for the controller to distribute, to the base station apparatus, the device identification information sent from the device. A step for the base station apparatus to store the device identification information distributed from the controller, and a digest value authenticating step of calculating a digest value with use of a specified function by using the device identification information stored in the device identification information storing step, the authentication information stored in the base station authentication information storing step, and the random number sent from the device, as input data, and comparing the calculated digest value with the digest value sent from the device, and in the connection authenticating step, the base station apparatus authenticates the connection with the device if it is judged that the calculated digest value coincides with the digest value sent from the device in the digest value authenticating step.

In the above arrangement, in the connection authentication completion notifying step, the controller is notified of the device identification information of identifying the device. In the device digest value calculating step, the digest value is calculated with use of the specified function by using the device identification information of identifying the device, the authentication information stored in the device authentication information storing step, and the predetermined random number stored in the device, as input data. In the digest value distributing step, the digest value calculated in the device digest value calculating step, and the random number are distributed to the base station apparatus. In the device identification information distributing step of the controller, the device identification information sent from the device is distributed to the base station apparatus. In the device identification information storing step of the base station apparatus, the device identification information distributed from the controller is stored. In the digest value authenticating step, the digest value is calculated with use of the specified function by using the device identification information, the authentication information, and the random number sent from the device, as input data, and the calculated digest value is compared with the digest value sent from the device. In the connection authenticating step, the connection with the device is authenticated if it is judged that the calculated digest value coincides with the digest value sent from the device.

In this way, since the connection authentication of the device by the base station apparatus is determined based on the judgment result as to whether the digest value calculated in the device coincides with the digest value calculated in the base station apparatus, security level of the connection between the device and the base station apparatus can be enhanced.

Preferably, a step for the controller to encrypt the authentication information, and a step for the device to decrypt the encrypted authentication information distributed from the controller.

In the above arrangement, the encrypted authentication information is distributed from the controller, and is decrypted by the device. Thus, since the authentication information distributed from the controller is encrypted, there is no likelihood that the authentication information may leak in the communication between the controller and the device.

Preferably, a step for the controller to count a time for accepting the connection authentication request from the device, and in the authentication information distributing step, the controller distributes the authentication information of the device if the time counted in the acceptance time counting step reaches a predetermined time.

In the above arrangement, in the acceptance time counting step of the base station apparatus, the time for accepting the connection authentication request from the device is counted, and in the authentication information distributing step, the authentication information of the device is distributed if the time counted in the acceptance time counting step reaches the predetermined time. This arrangement enables the distribution of the authentication information of the device upon lapse of the predetermined time, even if the controller is not notified that the base station apparatus has accepted the connection authentication request from the device.

Preferably, in the connection authenticating step, the base station apparatus does not authenticate connection if the connection authentication request is sent from a plurality of the devices.

In the above arrangement, the connection is not authenticated in the case where the base station apparatus has received the connection authentication request from the plurality of the devices. This arrangement eliminates likelihood that the authentication information may be set in a device other than the device of which the user wishes registration, and the other device may be registered.

Preferably, the above arrangement includes a step for the controller to display identification information of identifying the multiple base station apparatuses connectable with the controller in a list, and allowing the user to select the base station apparatus from among the displayed multiple base station apparatuses.

In the above arrangement, in the base station selecting/accepting step, the identification information of identifying the multiple base station apparatuses connectable with the controller are displayed in the list, and the user is allowed to select the base station apparatus from among the displayed multiple base station apparatuses. This arrangement enables the user to select the base station apparatus to be connected with the device from among the multiple base station apparatuses, and eliminates likelihood that the connection with multiple devices may be localized at a single base station apparatus, with the result that the communication system may suffer from heavy communication traffic.

According to a further aspect of the present invention, a base station apparatus is connectable with a controller and a device, the controller being provided with device registration starting means which starts registration of the device, and authentication information distributing means which distributes authentication information to the base station apparatus, and the device being provided with device authentication starting means which starts requesting authentication for connection with the base station apparatus, device authentication information storing means which stores the authentication information, and connection authentication requesting means which requests the connection authentication from the base station apparatus. The base station apparatus comprises: base station authentication information storing means which stores the authentication information distributed by the authentication information distributing means; base station authentication information distributing means which distributes, to the device, the authentication information stored in the base station authentication information storing means; and connection authenticating means which authenticates connection with the device. The connection authenticating means requests the authentication information from the device in response to accepting the connection authentication request by the connection authentication requesting means, the connection authentication requesting means reads out the authentication information stored in the device authentication information storing means, and sends the readout authentication information to the base station apparatus in response to accepting the authentication information request by the connection authenticating means, and the connection authenticating means receives the authentication information sent from the connection authentication requesting means, and authenticates connection with the device if it is judged that the received authentication information coincides with the authentication information stored in the base station authentication information storing means.

According to a further aspect of the present invention, a recording medium which stores a control program for controlling a base station apparatus is connectable with a controller and a device, the controller being functioned as device registration starting means which starts registration of the device, and authentication information distributing means which distributes authentication information to the base station apparatus, the device being functioned as device authentication starting means which starts requesting authentication for connection with the base station apparatus, device authentication information storing means which stores the authentication information, and connection authentication requesting means which requests the connection authentication from the base station apparatus. The control program stored in the recording medium causes the base station apparatus to function as: base station authentication information storing means which stores the authentication information distributed by the authentication information distributing means; base station authentication information distributing means which distributes, to the device, the authentication information stored in the base station authentication information storing means; and connection authenticating means which authenticates connection with the device. The connection authenticating means requests the authentication information from the device in response to accepting the connection authentication request by the connection authentication requesting means, the connection authentication requesting means reads out the authentication information stored in the device authentication information storing means, and sends the readout authentication information to the base station apparatus in response to accepting the authentication information request by the connection authenticating means, and the connection authenticating means receives the authentication information sent from the connection authentication requesting means, and authenticates connection with the device if it is judged that the received authentication information coincides with the authentication information stored in the base station authentication information storing means.

According to a further aspect of the present invention, a controller is connectable with a device and a base station apparatus, the device being provided with device authentication starting means which starts requesting authentication for connection with the base station apparatus, device authentication information storing means which stores authentication information, and connection authentication requesting means which requests the connection authentication from the base station apparatus, the base station apparatus being provided with base station authentication information storing means which stores the authentication information, base station authentication information distributing means which distributes, to the device, the authentication information stored in the base station authentication information storing means, and connection authenticating means which authenticates connection with the device. The controller comprises: device registration starting means which starts registration of the device; and authentication information distributing means which distributes, to the base station apparatus, the authentication information determined by the controller. The connection authenticating means requests the authentication information from the device in response to accepting the connection authentication request by the connection authentication requesting means, the connection authentication requesting means reads out the authentication information stored in the device authentication information storing means, and sends the readout authentication information to the base station apparatus in response to accepting the authentication information request by the connection authenticating means, and the connection authenticating means receives the authentication information sent from the connection authentication requesting means, and authenticates connection with the device if it is judged that the received authentication information coincides with the authentication information stored in the base station authentication information storing means.

According to a further aspect of the present invention, a recording medium which stores a control program for controlling a controller is connectable with a base station apparatus and a device, the device being functioned as device authentication starting means which starts requesting authentication for connection with the base station apparatus, device authentication information storing means which stores authentication information, and connection authentication requesting means which requests the connection authentication from the base station apparatus, the base station apparatus being functioned as base station authentication information storing means which stores the authentication information, base station authentication information distributing means which distributes, to the device, the authentication information stored in the base station authentication information storing means, and connection authenticating means which authenticates connection with the device. The control program stored in the recording medium causes the controller to function as: device registration starting means which starts registration of the device; and authentication information distributing means which distributes, to the base station apparatus, the authentication information determined by the controller. The connection authenticating means requests the authentication information from the device in response to accepting the connection authentication request by the connection authentication requesting means, the connection authentication requesting means reads out the authentication information stored in the device authentication information storing means, and sends the readout authentication information to the base station apparatus in response to accepting the authentication information request by the connection authenticating means, and the connection authenticating means receives the authentication information sent from the connection authentication requesting means, and authenticates connection with the device if it is judged that the received authentication information coincides with the authentication information stored in the base station authentication information storing means.

According to a further aspect of the present invention, a device is connectable with a controller and a base station apparatus, the controller being provided with device registration starting means which starts registration of the device, and authentication information distributing means which distributes authentication information to the base station apparatus, the base station apparatus being provided with base station authentication information storing means which stores the authentication information distributed by the authentication information distributing means, base station authentication information distributing means which distributes, to the device, the authentication information stored in the base station authentication information storing means, and connection authenticating means which authenticates connection with the device. The device comprises: device authentication starting means which starts requesting authentication for connection with the base station apparatus; device authentication information storing means which stores the authentication information distributed by the base station authentication information distributing means; and connection authentication requesting means which requests the authentication connection from the base station apparatus. The connection authenticating means requests the authentication information from the device in response to accepting the connection authentication request by the connection authentication requesting means, the connection authentication requesting means reads out the authentication information stored in the device authentication information storing means, and sends the readout authentication information to the base station apparatus in response to accepting the authentication information request by the connection authenticating means, and the connection authenticating means receives the authentication information sent from the connection authentication requesting means, and authenticates connection with the device if it is judged that the received authentication information coincides with the authentication information stored in the base station authentication information storing means.

According to still another aspect of the present invention, a recording medium which stores a control program for controlling a device is connectable with a controller and a base station apparatus, the controller being functioned as device registration starting means which starts registration of the device, and authentication information distributing means which distributes, to the base station apparatus, authentication information, the base station apparatus being functioned as base station authentication information storing means which stores the authentication information distributed by the authentication information distributing means, base station authentication information distributing means which distributes, to the device, the authentication information stored in the base station authentication information storing means, and connection authenticating means which authenticates connection with the device. The control program stored in the recording medium causes the device to function as: device authentication starting means which starts requesting authentication for connection with the base station apparatus; and device authentication information storing means which stores the authentication information distributed by the base station authentication information distributing means, and connection authentication requesting means requests the connection authentication from the base station apparatus. The connection authenticating means which requests the authentication information from the device in response to accepting the connection authentication request by the connection authentication requesting means, the connection authentication requesting means reads out the authentication information stored in the device authentication information storing means and sends the readout authentication information to the base station apparatus in response to accepting the authentication information request by the connection authenticating means, and the connection authenticating means receives the authentication information sent from the connection authentication requesting means, and authenticates connection with the device if it is judged that the received authentication information coincides with the authentication information stored in the base station authentication information storing means.

In the above arrangements, in response to the start of the device registration by the device registration starting means of the controller, the authentication information distributing means distributes, to the base station apparatus, the authentication information determined by the controller. The authentication information distributed by the authentication information distributing means is stored in the base station authentication information storing means. The authentication information stored in the base station authentication information storing means is distributed to the device by the base station authentication information distributing means. The authentication information distributed by the base station authentication information distributing means is stored in the device authentication information storing means of the device. In response to the connection authentication request by the device authentication starting means of the device, the connection authentication requesting means requests the connection authentication from the base station apparatus. In response to accepting the connection authentication request by the connection authentication requesting means, the connection authenticating means requests the authentication information from the device. When the connection authentication requesting means accepts the authentication information request by the connection authenticating means, the authentication information stored in the device authentication information storing means is read out, and the readout authentication information is sent to the base station apparatus. The authentication information sent from the connection authentication requesting means is received by the connection authenticating means, and the connection with the device is authenticated if the received authentication information coincides with the authentication information stored in the base station authentication information storing means.

Thus, in response to the connection request from the device, the controller distributes the authentication information of the device to the base station apparatus for storage. The authentication information is also sent to the device for storage. The connection authentication between the device and the base station apparatus is established by using the authentication information. This arrangement semi-automatically establishes connection authentication of the specific device without need of a cumbersome operation by the user of entering a password, a PIN code or the like.

This application is based on Japanese Patent Application No. 2003-186809 filed on Jun. 30, 2003, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A communication system comprising a base station apparatus, a controller connected to the base station apparatus, and a device that requires an authentication to be connected to the base station apparatus, wherein the controller includes:
device registration starting means which starts a registration of the device;
authentication password distributing means which distributes, to the base station apparatus, an authentication password determined by the controller; and
authentication mode switching means which switches a connection authentication mode of the base station apparatus by designating the connection authentication mode to be implemented by the base station apparatus, wherein the base station apparatus includes
base station authentication password storing means which stores the authentication password distributed by the authentication password distributing means of the controller;
authentication mode storing means which stores the connection authentication mode designated by the authentication mode switching means of the controller; and
connection authenticating means which authenticates the device to permit a connection with the device in accordance with the connection authentication mode stored in the authentication mode storing means, wherein the device includes:
device authentication starting means which starts requesting the authentication required for the connection to the base station apparatus;
device authentication password storing means which stores the authentication password distributed to the base station apparatus by the authentication password distributing means of the controller; and
connection authentication requesting means which transmits a request to receive the authentication from the base station apparatus, wherein the authentication mode switching means of the controller instructs the authentication mode storing means of the base station apparatus to switch the connection authentication mode from a first connection authentication mode, in which a connection is authenticated when an authentication is permitted in accordance with a prescribed procedure, to a second connection authentication mode, in which the connection is permitted without the authentication to be connected, in response to receiving a device registration starting notification, at a starting time of the registration of the device, from the device registration starting means of the controller, wherein the second connection authentication mode in which the connection is permitted without authentication is utilized at a beginning of the registration of the device and until a termination of an initial authentication of the device, wherein the connection authenticating means of the base station apparatus transmits a connection notification to the authentication password distributing means of the controller at the termination of the initial authentication of the device, wherein the authentication password distributing means of the controller distributes an identical authentication password to the base station apparatus and the device in response to receiving the connection notification from the base station apparatus, and wherein the authentication mode switching means of the controller instructs the authentication storing means of the base station apparatus to switch the connection authentication mode from the second connection authentication mode to the first connection authentication mode, in response to a termination of the distribution of the authentication password distributed by the authentication password distributing means of the controller.

2. The communication system according to claim 1, wherein the base station apparatus and the device are communicatively connected to each other by wireless communication.

3. The communication system according to claim 1, wherein:
the device further includes connection authentication completion notifying means which notifies the controller that the authentication of the connection by the base station apparatus has been completed; and
the controller further includes device registration completion notifying means which notifies a user of the connection authentication completion notification in response to receiving the notification from the connection authentication completion notifying means of the device.

4. The communication system according to claim 3, wherein:
the device further includes device digest value calculating means which calculates a digest value using a specified function that uses (i) device identification information that identifies the device, (ii) the authentication password stored in the device authentication password storing means, and (iii) a predetermined random number stored in the device, as input data;
the device further includes digest value distributing means which distributes, to the base station apparatus, (i) the digest value calculated by the device digest value calculating means, and (ii) the predetermined random number;
the base station apparatus further includes device identification information storing means which stores the device identification information distributed from the controller, and includes digest value authenticating means which calculates a digest value using a specified function that uses (i) the device identification information stored in the device identification information storing means, (ii) the authentication password stored in the base station authentication password storing means, and (iii) the random number sent from the device, as input data, and compares the digest value calculated by the digest value calculating means of the base station apparatus with the digest value sent from the device; and the connection authenticating means of the base station apparatus authenticates the connection with the device if the digest value authenticating means judges that the digest value calculated by the digest value calculating means coincides with the digest value sent from the device.

5. The communication system according to claim 1, wherein:

the controller further includes authentication password encrypting means which encrypts the authentication password; and the device further includes authentication password decrypting means which decrypts the encrypted authentication password distributed from the controller.

6. The communication system according to claim 1, wherein:

the controller further includes acceptance time counting means which counts a time for accepting the request to receive the authentication from the device; and the authentication password distributing means distributes the authentication password of the device if the time counted by the acceptance time counting means reaches a predetermined time.

7. The communication system according to claim 1, wherein the connection authenticating means of the base station apparatus does not authenticate the connection if the request to receive the authentication is sent from a plurality of devices.

8. The communication system according to claim 1, wherein the controller further includes base station selecting/accepting means which displays multiple base station apparatuses that are connectable with the controller in a list, and allows a user to select the base station apparatus from among the displayed multiple base station apparatuses.

9. A communication method used for a communication system comprising a base station apparatus, a controller connectable to the base station apparatus, and a device that requests an authentication to be connected to the base station apparatus, said communication method comprising:

a device registration starting step for the controller to start a registration of the device in response to a designation by a user;

a first authentication mode switching step for the controller to switch a connection authentication mode of the base station apparatus from a first connection authentication mode, in which a connection is permitted when an authentication is activated in accordance with a prescribed procedure, to a second connection authentication mode, in which a connection is permitted without the authentication;

an authentication mode storing step for the base station apparatus to store the second authentication mode in response to receiving a switching instruction in the first authentication mode switching step;

a connection authentication requesting step for the device to request a connection authentication to the base station apparatus;

a connection authenticating step for authenticating the device to permit a connection with the device in accordance with the connection authentication mode stored in the authentication mode storing step;

a connection notifying step for the base station apparatus to send a connection notification to the controller in a case when the connection-permitted device is a device that is initially connected in the connection authentication step;

an authentication password distributing step for the controller to distribute an identical authentication password that is determined by the controller to (i) the base station apparatus and (ii) the device, in response to receiving the connection notification from the base station apparatus;

a base station authentication password storing step for the base station apparatus to store the authentication password distributed in the authentication password distributing step;

a device authentication password storing step for the device to store the authentication password distributed in the authentication password distributing step; and a second authentication mode switching step for the controller to switch the connection authentication mode of the base station apparatus from the second connection authentication mode to the first connection authentication mode, in response to a termination of the distribution of the authentication password in the authentication password distributing step of the controller, wherein the second connection authentication mode in which the connection is permitted without authentication is utilized at a beginning of the registration of the device and until a termination of an initial authentication of the device.

10. A base station apparatus connectable to a controller and a device, the base station apparatus comprising:

base station authentication password storing means which stores an authentication password distributed by the controller;

authentication mode storing means which stores a connection authentication mode designated by the controller; and connection authenticating means which authenticates the device to permit a connection with the device, the connection being authenticated in accordance with the connection authentication mode stored in the authentication mode storing means, wherein the authentication mode storing means stores a second connection authentication mode, in response to receiving an instruction, from the controller, to switch the connection authentication mode from a first connection authentication mode, in which a connection is authenticated when an authentication is permitted in accordance with a prescribed procedure, to the second connection authentication mode, in which the connection is permitted without the authentication to be connected, wherein the second connection authentication mode in which the connection is permitted without authentication is utilized at a beginning of the registration of the device and until a termination of an initial authentication of the device, wherein the connection authenticating means transmits a connection notification to the controller in response to a success of an initial authentication to be connected to the device, wherein the base station authentication password storing means stores the authentication password in response to receiving the authentication password from the controller, an identical authentication password being distributed from the controller to the device, and wherein the authentication mode storing means stores the first connection authentication mode in response to receiving an instruction, from the controller, to switch the connection authentication mode from the second connection authentication mode to the first connection authentication mode.

11. A computer-readable storage medium having a control program stored thereon, the control program for controlling a base station apparatus connectable to a controller and a device, the control program causing the base station apparatus to function as:

base station authentication password storing means which stores an authentication password distributed by the controller;

authentication mode storing means which stores a connection authentication mode designated by the controller; and connection authenticating means which authenticates the device to permit a connection with the device in accordance with the connection authentication mode stored in the authentication mode storing means, wherein the authentication mode storing means stores a second connection authentication mode, in response to receiving an instruction, from the controller, to switch the connection authentication mode from a first connection authentication mode, in which a connection is authenticated when an authentication is permitted in accordance with a prescribed procedure, to the second connection authentication mode, in which the connection is permitted without the authentication to be connected, wherein the second connection authentication mode in which the connection is permitted without authentication is utilized at a beginning of the registration of the device and until a termination of an initial authentication of the device, wherein the connection authenticating means transmits a connection notification to the controller in response to a success of an initial authentication to be connected to the device, wherein the base station authentication password storing means stores the authentication password in response to receiving authentication password from the controller, an identical authentication password being distributed from the controller to the device, and wherein the authentication mode storing means stores the first connection authentication mode in response to receiving an instruction, from the controller, to switch the connection authentication mode from the second connection authentication mode to the first connection authentication mode.

12. A controller connectable with a base station apparatus which performs an authentication to be connected to a device, the controller comprising:

device registration starting means which starts a registration of the device;

authentication password distributing means which distributes, to the base station apparatus, an authentication password determined by the controller; and authentication mode switching means which switches a connection authentication mode of the base station apparatus by designating the connection authentication mode to be implemented by the base station apparatus, wherein the authentication mode switching means instructs the base station apparatus to switch the connection authentication mode from a first connection authentication mode, in which a connection is authenticated when an authentication is permitted in accordance with a prescribed procedure, to a second connection authentication mode, in which the connection is permitted without activating the authentication, in response to receiving a device registration starting notification at a starting time of the registration of the device from the device registration starting means, wherein the second connection authentication mode in which the connection is permitted without authentication is utilized at a beginning of the registration of the device and until a termination of an initial authentication of the device, wherein the authentication password distributing means distributes an identical authentication password to the base station apparatus and the device in response to receiving, from the base station apparatus, a connection notification notified at the termination of the initial authentication of the device, and wherein the authentication mode switching means instructs the base station apparatus to switch the connection authentication mode from the second connection authentication mode to the first connection authentication mode, in response to a termination of the distribution of the authentication password distributed by the authentication password distributing means.

13. A computer-readable storage medium having a control program stored thereon, the control program for controlling a controller connectable to a base station apparatus which performs an authentication to be connected to a device, the control program causing the controller to function as:

device registration starting means which starts a registration of the device;

authentication password distributing means which distributes, to the base station apparatus, an authentication password determined by the controller; and authentication mode switching means which switches a connection authentication mode of the base station apparatus by designating the connection authentication mode to be implemented by the base station apparatus, wherein the authentication mode switching means instructs the base station apparatus to switch the connection authentication mode from a first connection authentication mode, in which a connection is authenticated when an authentication is permitted in accordance with a prescribed procedure, to a second connection authentication mode, in which the connection is permitted without activating the authentication, in response to receiving a device registration starting notice at a starting time of the registration of the device from the device registration starting means, wherein the second connection authentication mode in which the connection is permitted without authentication is utilized at a beginning of the registration of the device and until a termination of an initial authentication of the device, wherein the authentication password distributing means distributes an identical authentication password to the base station apparatus and the device in response to receiving, from the base station apparatus, a connection notification notified at the termination of the initial authentication of the device, and wherein the authentication mode switching means instructs the base station apparatus to switch the connection authentication mode from the second connection authentication mode to the first connection authentication mode, in response to a termination of the distribution of the authentication password distributed by the authentication password distributing means.

14. The communication system according to claim 1, wherein:
   the connection authenticating means requests the authentication password from the device in response to accepting the request to receive the authentication transmitted by the connection authentication requesting means;
   the connection authentication requesting means reads out the authentication password stored in the device authentication password storing means and sends the read-out authentication password to the base station apparatus in response to accepting the authentication password request by the connection authenticating means;
   the connection authenticating means receives the authentication password sent from the connection authentication requesting means, and authenticates the connection to the device if it is judged that the received authentication password coincides with the authentication password stored in the base station authentication password storing means.

15. The communication system according to claim 4, wherein:
   the controller further includes device identification information distributing means which distributes apparatus identification information received from the device to the base station apparatus;
   the connection authentication completion notifying means of the device notifies, to the controller device, identification information for identification of the device;
   the device identification information distributing means of the controller sends the received device identification information to the base station apparatus in response to receiving the device identification information sent from the device; and
   the device identification information storing means of the base station apparatus stores the received device identification information in response to receiving the device identification information sent from the controller.

* * * * *

UNITED STATES PATENT AND TRADEMARK OFFICE
CERTIFICATE OF CORRECTION

PATENT NO.         : 7,707,418 B2  
APPLICATION NO.    : 10/876577  
DATED              : April 27, 2010  
INVENTOR(S)        : Tsunehito Tsushima et al.

It is certified that error appears in the above-identified patent and that said Letters Patent is hereby corrected as shown below:

On the Title Page

In item (57) Abstract, please replace the Abstract as follows:

--A communication system is constructed in such a manner that a user is allowed to designate a controller and a wireless device simultaneously to start authentication for connection with a wireless base station to specify the device to be connected, and to establish connection authentication without a password for the first time. Thereafter, the controller distributes a password to the wireless base station and to the wireless device to cancel the connection authentication. Next, connection authentication with the distributed password is established. Thus, the communication system makes it possible to automatically establish connection authentication, thereby eliminating a cumbersome operation by the user in implementing the connection authentication process--

Signed and Sealed this  
Fifteenth Day of May, 2012

David J. Kappos  
*Director of the United States Patent and Trademark Office*